United States Patent [19]

Ogawa

[11] Patent Number: 6,009,267
[45] Date of Patent: Dec. 28, 1999

[54] APPARATUS FOR ANALYZING THE TASK SPECIFICATION (BUSINESS RULE SPECIFICATION) OF A SOURCE PROGRAM

[75] Inventor: Akira Ogawa, Kawasaki, Japan

[73] Assignee: Fujitsu Limited, Kawasaki, Japan

[21] Appl. No.: 09/018,298

[22] Filed: Feb. 4, 1998

Related U.S. Application Data

[63] Continuation of application No. 08/301,960, Sep. 7, 1994, abandoned.

[30] Foreign Application Priority Data

Sep. 30, 1993 [JP] Japan .................................. 5-245714

[51] Int. Cl.[6] ...................................................... G06F 9/45
[52] U.S. Cl. .............................................................. 395/701
[58] Field of Search ..................................... 395/701, 702, 395/703, 704, 705, 706, 707, 708, 709, 500, 682

[56] References Cited

U.S. PATENT DOCUMENTS

| | | |
|---|---|---|
| 4,495,562 | 1/1985 | Yamaji et al. . |
| 4,558,413 | 12/1985 | Schmidt et al. . |
| 4,809,170 | 2/1989 | Leblang et al. . |
| 4,819,233 | 4/1989 | Delucia et al. ........................ 395/704 |
| 4,862,349 | 8/1989 | Foreman et al. ...................... 395/682 |
| 5,251,317 | 10/1993 | Iizuka et al. . |
| 5,305,450 | 4/1994 | Naito et al. ............................ 395/500 |
| 5,488,727 | 1/1996 | Agrawal et al. ...................... 395/709 |
| 5,511,198 | 4/1996 | Hotta . |

FOREIGN PATENT DOCUMENTS 5-40616   2/1993   Japan .

OTHER PUBLICATIONS

Ambriola et al., "The Evolution of Configuration Management and Version Control", Software Engineering Journal, IEEE, Nov. 1990, pp. 303–310.

Colbrook et al., "Data Abstraction in a Software Re-engineering Reference Model", Software Maintenance 1990 Conference, IEEE, 1990, pp. 2–11.

Primary Examiner—Tariq R. Hafiz
Assistant Examiner—Wei Zhen
Attorney, Agent, or Firm—Staas & Halsey LLP

[57] ABSTRACT

An apparatus for analyzing the task specification of a source program automatically extracts and outputs data necessary in rebuilding the source program, it reduces the workload of a human operator performing maintenance works, thereby enhancing efficiency in rebuilding work.

22 Claims, 30 Drawing Sheets

```
01      AAA      PIC    9(3).

88         BBB VALUE 001.

88         CCC VALUE 002.

IF    BBB

THEN
```

FIG. 3

```
000100      FILE-CONTROL.
000110          SELECT    INFILE    ASSIGN  TO  INDD.
000120          SELECT    OUTFILE   ASSIGN  TO  OUTDD.
                    :
000130      DATA  DIVISION.
000140      FILE  SECTION.
000150      FD    INFILE.
000160      01    INREC.
000170          02  INREC-A
000180              03  IN-ENTYEAR    PIC   9(2) .
000190              03  IN-SERNO      PIC   9(4) .
000200          02  IN-NAME           PIC   X(20).
000210          02  IN-SEC-CODE       PIC   X(4) .
000220          02  FILLER            PIC   X(44).
000230      FD    OUTFILE.
000240      01    OUTREC.
000250          02  OUTREC-A.
000260              03  OT-ENTYEAR    PIC   9(2) .
000270              03  OT-SERNO      PIC   9(4) .
000280          02  OT-NAME           PIC   X(20).
000290          02  OT-SEC-CODE       PIC   X(4) .
000300          02  FILLER            PIC   X(44).
000310      WORKING-STORAGE  SECTION.
000320      01    WK-XXX.
000330          02  WKREC-A.
000340              03  WK-ENTYEAR    PIC   9(2) .
000350              03  WK-SERNO      PIC   9(4) .
000360          02  WK-NAME           PIC   X(20).
000370          02  WK-SEC-CODE       PIC   X(4) .
            01    WK-ERRCODE          PIC   9(4) .
                    :
000400      PROCEDURE  DIVISION  USING  LK-A.
                    :
000500          OPEN   INPUT    INFILE.              (1211)
000510          OPEN   OUTPUT   OUTFILE.             (1212)
000520          READ   INFILE AT END GO TO LABEL-END.(1213)
000530          IF IN-ENTYEAR IS NOT NUMERIC         (1214)
000540             THEN MOVE 0001 TO WK-ERRCODE.
000550          IF IN-SERNO   IS NOT NUMERIC         (1215)
000560             THEN MOVE 0002 TO WK-ERRCODE.
000570          IF IN-NAME     =SPACE                (1216)
000580             THEN MOVE 0003 TO WK-ERRCODE.
000590          IF IN-SEC-CODE =SPACE                (1217)
000600             THEN MOVE 0004 TO WK-ERRCODE.
                    :
000690          IF WK-SEC-CODE = '1' AND IN-NAME =SPACE
000700             MOVE  IN-ENTYEAR  TO  OT-ENTYEAR. (1218)
000710             MOVE  IN-SERNO    TO  OT-SERNO.   (1219)
000720             MOVE  IN-NAME     TO  OT-NAME.    (1220)
                    :
000800          MOVE  IN-ENTYEAR  TO  WK-ENTYEAR.    (1221)
000810          MOVE  0001        TO  WK-SERNO.      (1222)
000820          MOVE  SPACE       TO  WK-NAME.       (1223)
000830          CALL 'SUBPROG1' UNING  WK-XXX.
                    :
000900          WRITE OUTREC.                        (1225)
                    :
```

Fig. 4

| DATA ITEM NAME | SECTION NAME | USAGE PURPOSE | RECORD NAME |
|---|---|---|---|
| INREC | FILE | file | |
| INREC-A | FILE | file | INREC |
| IN-ENTYEAR | FILE | file | INREC |
| IN-SERNO | FILE | file | INREC |
| IN-NAME | FILE | file | INREC |
| IN-SEC-CODE | FILE | file | INREC |
| OUTREC | FILE | file | |
| OUTREC-A | FILE | file | OUTREC |
| OT-ENTYEAR | FILE | file | OUTREC |
| OT-SERNO | FILE | file | OUTREC |
| OT-NAME | FILE | file | OUTREC |
| OT-REC-CODE | FILE | file | OUTREC |
| WK-XXX | WORK | other | |
| WKREC-A | WORK | other | WK-XXX |
| WK-ENTYEAR | WORK | other | WK-XXX |
| WK-SERNO | WORK | other | WK-XXX |
| WK-NAME | WORK | other | WK-XXX |
| WK-SEC-CODE | WORK | other | WK-XXX |
| WK-ERRCODE | WORK | other | |

F I G. 5 A

| FILE NAME | RECORD NAME | OPEN MODE |
|---|---|---|
| INFILE | INREC | INPUT |
| OUTFILE | OUTREC | OUTPUT |

FIG. 5B

| STATEMENT USED | IDENTIFIER | COMPARISON OPERATOR | CONSTANT |
|---|---|---|---|
| IF | IN-ENTYRAR | IS NOT | NUMERIC |
| IF | IN-SERNO | IS NOT | NUMERIC |
| IF | IN-NAME | = | SPACE |
| IF | IN-SEC-CODE | = | SPACE |
| IF | WK-SEC-CODE | = | '1' |
| IF | IN-NAME | = | SPACE |

FIG. 8

```
NEST HIERARCHIES
    1           EVALUATE  WK-A
    1              WHEN  '1'                        ⇒ ①
    2                 SEARCH  TBL-A
    2                    WHEN  KEY-A = '1'          ⇒ ②
    3                       MOVE    TBL-A-B  TO  X
    3                              ⋮
    2                    WHEN  KEY-A = '2'          ⇒ ③
    3                       MOVE    TBL-A-B  TO  Y
    3                              ⋮
    2                    WHEN  KEY-A = '3'          ⇒ ④
    3                       MOVE    TBL-A-B  TO  Z
    3
    2                 END-SEARCH                    ⇒ ⑤
    1              WHEN  '2'                        ⇒ ⑥
    2                 EVALUATE  WK-B
    2                    WHEN  '1'                  ⇒ ⑦
    3                       MOVE    WK-B  TO  A
    2                    WHEN  '2'                  ⇒ ⑧
    3                       MOVE    WK-B  TO  B
    2                 END-EVALUATE                  ⇒ ⑨
    1              END-EVALUATE.                    ⇒ ⑩
```

Fig. 9

| 200 HIERARCHICAL STORAGE TABLE | 201 FIRST HIERARCHY | 202 SECOND HIERARCHY | 203 THIRD HIERARCHY |
|---|---|---|---|
| 1 | ① WK-A = '1' | ② KEY-A = '1' ⇒ | FILE OUTPUT |
| 2 | | ③ KEY-A = '2' ⇒ | FILE OUTPUT |
| 3 | | ④ KEY-A = '3' ⇒ | FILE OUTPUT |
| ⋮ | | | |

FIG. 10A

| 200 HIERARCHICAL STORAGE TABLE | 201 FIRST HIERARCHY | 202 SECOND HIERARCHY | 203 THIRD HIERARCHY |
|---|---|---|---|
| 1 | ① WK-A = '1' | ⑦ WK-B = '1' ⇒ | FILE OUTPUT |
| 2 | ⑥ WK-A = '2' | ⑧ WK-B = '2' ⇒ | FILE OUTPUT |
| ⋮ | | | |

FIG. 10B

| 200 HIERARCHICAL STORAGE TABLE | 201 FIRST HIERARCHY | 202 SECOND HIERARCHY | 203 THIRD HIERARCHY |
|---|---|---|---|
| 1 | ① WK-A = '1' ⇒ | FILE OUTPUT | |
| 2 | ⑥ WK-A = '2' ⇒ | FILE OUTPUT | |
| ⋮ | | | |

FIG. 10C

| STATEMENT USED | IDENTIFIER | COMPARATIVE OPERATOR | CONSTANT |
|---|---|---|---|
| IF | WK−SEC−CODE | = | '1' |
| | | AND | |
| | IN−NAME | = | SPACE |

| NUMBER OF TIMES USED | IDENTIFIER | COMPARATIVE OPERATOR | CONSTANT |
|---|---|---|---|
| 1 | IN-ENTYEAR | IS NOT | NUMERIC |
| 2 | IN-NAME | = | SPACE |
| 1 | IN-SEC-CODE | = | SPACE |
| 1 | IN-SERNO | IS NOT | NUMERIC |
| 1 | WK-SEC-CODE | = | '1' |

F I G. 1 4

| DESCRIPTION OF SOURCE PROGRAM | REPLACEMENT IN CONDENSATION | CONDENSATION RESULT |
|---|---|---|
| AAA (1) | → | AAA (1) |
| AAA (2) | → | AAA (2) |
| AAA (IX-X) | → | AAA (*) |
| AAA (IX-Y) | → | AAA (*) |
| BBB (1 1) | → | BBB (1 1) |
| BBB (1 IX-2) | → | BBB (*) |
| BBB (IX-1 IX-2) | → | BBB (*) |

Fig. 15

| NUMBER OF TIMES USED | COMPLEX CONDITION |
|---|---|
| 1 | WK-SEC-CODE = '1' AND IN-NAME SPACE |

SIMPLE CONDITION 125

| IDENTIFIER | COMPARATIVE OPERATOR | CONSTANT | TASK NOMENCLATURE |
|---|---|---|---|
| IN-ENTYEAR | IS NOT | NUMERIC | WRONG YEAR INPUT |
| IN-NAME | = | SPACE | WRONG PERSONAL NAME INPUT |
| IN-SEC-CODE | = | SPACE | WRONG DIVISION CODE INPUT |
| IN-SERNO | IS NOT | NUMERIC | WRONG EMPLOYEE NUMBER INPUT |
| WK-SEC-CODE | = | '1' | TOKYO AREA |

FIG. 18A

COMPLEX CONDITION 127

| COMPLEX CONDITION | TASK NOMENCLATURE |
|---|---|
| WK-SEC-CODE='1' AND IN-NAME=SPACE | TOKYO SALES OFFICE |

FIG. 18B

WK-XXX

FIG. 19

| LINE NUMBER | COMPUTER CONTROL/ TASK SPECIFICATION | OBJECT RECORD NAME |
|---|---|---|
| 000500 | COMPUTER CONTROL | |
| 000510 | COMPUTER CONTROL | |
| 000520 | COMPUTER CONTROL | |
| 000530 | TASK SPECIFICATION (CHECK) | INREC |
| 000550 | TASK SPECIFICATION (CHECK) | INREC |
| 000570 | TASK SPECIFICATION (CHECK) | INREC |
| 000590 | TASK SPECIFICATION (CHECK) | INREC |
| ⋮ | | |
| 000690 | TASK SPECIFICATION (CHECK) | INREC |
| 000690 | TASK SPECIFICATION (CHECK) | WK-XXX |
| 000700 | TASK SPECIFICATION (UPDATE) | OUTREC |
| 000710 | TASK SPECIFICATION (UPDATE) | OUTREC |
| 000720 | TASK SPECIFICATION (UPDATE) | OUTREC |
| ⋮ | | |
| 000800 | TASK SPECIFICATION (UPDATE) | WK-XXX |
| 000810 | TASK SPECIFICATION (UPDATE) | WK-XXX |
| 000820 | TASK SPECIFICATION (UPDATE) | WK-XXX |
| ⋮ | | |
| 000900 | COMPUTER CONTROL | |

| COMPUTER CONTROL | INREC | OUTREC | WK1XXX | | 1001 COMMENT DATA 127L | |
|---|---|---|---|---|---|---|
| | | | | | | TASK NOMENCLATURE |
| | | | | 000400 | PROCEDURE DIVISION USING LK-A | |
| * | | | | 000500 | OPEN INPUT INFILE. | |
| * | | | | 000510 | OPEN OUTPUT OUTFILE. | |
| * | | | | 000520 | READ INFILE AT END GO TO LABEL-END. | |
| | C | | | 000530 | IF IN-ENTYEAR IS NOT NUMERIC. | WRONG YEAR INPUT |
| | | | | 000540 | THEN MOVE 0001 TO WK-ERRCODE. | |
| | C | | | 000550 | IF IN-SERNO IS NOT NUMERIC. | WRONG EMPLOYEE NUMBER INPUT |
| | | | | 000560 | THEN MOVE 0002 TO WK-ERRCODE. | |
| | C | | | 000570 | IF IN-NAME = SPACE | WRONG PERSONAL NAME INPUT |
| | | | | 000580 | THEN MOVE 0003 TO WK-ERRCODE. | |
| | C | | | 000590 | IF IN-SEC-CODE = SPACE | WRONG DIVISION CODE INPUT |
| | | | | 000600 | THEN MOVE 0004 TO WK-ERRCODE. | |
| | C | | C | 000690 | IF WK-SEC-CODE='1' AND IN-NAME =SPACE | TOKYO SALES OFFICE |
| | | U | | 000700 | MOVE IN-ENTYEAR TO OT-ENTYEAR | |
| | | U | | 000710 | MOVE IN-SERNO TO OT-SERNO | |
| | | U | | 000720 | MOVE IN-NAME TO OT-NAME. | |
| | | | U | 000800 | MOVE IN-ENTYEAR TO WK-ENTYEAR. | |
| | | | U | 000810 | MOVE 0001 TO WK-SERNO. | |
| | | | U | 000820 | MOVE SPACE TO WK-NAME. | |
| | | | | 000830 | CALL 'SUBPROG1' USING WK-XXX. | |
| * | | | | 000900 | WRITE OUTREC. | |

C: CHECK PROCESS
U: UPDATE PROCESS

Fig. 23

| APPEARANCE NUMBER | IDENTIFIER | COMPARATIVE OPERATOR | CONSTANT | TASK NOMENCLATURE |
|---|---|---|---|---|
| 1 | KEY-A | = | '1' | A FACTORY PRODUCT |
| 1 | KEY-A | = | '2' | B FACTORY PRODUCT |
| 1 | KEY-A | = | '3' | C FACTORY PRODUCT |
| 1 | WK-B | = | '1' | WITH INVENTORY |
| 1 | WK-B | = | '2' | WITHOUT INVENTORY |
| 1 | WK-A | = | '1' | SPECIAL PRODUCT |
| 1 | WK-A | = | '2' | GENERAL PRODUCT |

|  | TASK NOMENCLATURE |
|---|---|
| EVALUATE WK-A | |
|   WHEN '1' | SPECIAL PRODUCT |
|     SEARCH TBL-A | |
|       WHEN KEY-A = '1' | A FACTORY PRODUCT |
|         MOVE TBL-A-B TO X | |
|           ⋮ | |
|       WHEN KEY-A = '2' | B FACTORY PRODUCT |
|         MOVE TBL-A-B TO Y | |
|           ⋮ | |
|       WHEN KEY-A = '3' | C FACTORY PRODUCT |
|         MOVE TBL-A-B TO Z | |
|           ⋮ | |
|     END-SEARCH | |
|   WHEN '2' | GENERAL PRODUCT |
|     EVALUATE WK-B | |
|       WHEN '1' | WITH INVENTORY |
|         MOVE WK-B TO A | |
|       WHEN '2' | WITH INVENTORY |
|         MOVE WK-B TO B | |
|     END-EVALUATE | |
| END-EVALUATE | |

| CHECK UPDATE DEFINITION | | TITLE | | DATA | VERSION | AUTHOR |
|---|---|---|---|---|---|---|
| PROCESS NAME | SPECIFICATION BLOCK NAME | EXPLANATION OF SPECIFICATION BLOCK | | | | |
| PROGRAM 1 | SPECIFICATION BLOCK 1 | | | | | |

| DATA ITEM NAME | IDENTIFICATION NAME | CHECK(?)/UPDATE(=) CLASSIFICATION | EXPLANATION OF ITEM SPECIFICATION |
|---|---|---|---|
| OUTREC 0001 | OUTREC | UPDATE | |

| No. | CLASSIFICATION | DATA ITEM | ?/= | PROCESS | DOMAIN | CONDITION | REMARKS |
|---|---|---|---|---|---|---|---|
| 1 | | OT-ENTYEAR | = | IN-ENTYEAR | | TOKYO SALES OFFICE | |
| 2 | | OT-SERNO | = | IN-SERNO | | TOKYO SALES OFFICE | |
| 3 | | OT-NAME | = | IN-NAME | | TOKYO SALES OFFICE | |
| ... | | ... | | ... | | ... | |

```
ENVIRONMENT     DIVISION.
CONFIGURATION   SECTION.
    SUBSCHEMA   NAME.       'SUBSCH01'
         ⋮
INPUT-OUTPUT    SECTION.
FILE-CONTROL.
    SELECT DSP-FILE ASSIGN TO GS-DSP
       SYMBOLIC DESTINATION IS   'DSP'
       DESTINATION-1         IS DSP-DEST-1
             ⋮
    SELECT   INFILE    ASSIGN TO INDD.
    SELECT   OUTFILE   ASSIGN TO OUTDD.
         ⋮
DATA   DIVISION.
FILE   SECTION.
FD     DSP-FILE.
01  MENUREC.                                              ┐  COMMUNICATION FUNCTION
    02   MENUREC-01    PIC  X(1).                         ┘  MESSAGE AREA DEFINITION
         ⋮
FD     INFILE.
01  INREC.                                                ┐
    02   INREC-A.
         03   IN-ENTYEAR  PIC  9(2).                         AREA DEFINITION OF
         03   IN-SERNO    PIC  9(4).                         INPUT FILE
    02   IN-NAME         PIC  X(20).
    02   IN-SEC-CODE     PIC  X(4).
    02   FILLER          PIC  X(44).                      ┘
FD     OUTFILE.
01  OUTREC.                                               ┐
    02   OUTREC-A.
         03   OUT-ENTYEAR PIC  9(2).                         AREA DEFINITION OF
         03   OUT-SERNO   PIC  9(4).                         OUTPUT FILE
    02   OUT-NAME        PIC  X(20).
    02   OUT-SEC-CODE    PIC  X(4).
    02   FILLER          PIC  X(44).                      ┘
WORKING-STORAGE SECTION.
01  WK-XXX.                                               ┐
    02   WKREC-A.
         03   WK-ENTYEAR  PIC  9(2).                         RECORD DEFINITION
         03   WK-SERNO    PIC  9(4).                         DESIGNATED BY
    02   WK-NAME         PIC  X(20).                         RECORD NAME FILE
    02   WK-SEC-CODE     PIC  X(4).
    02   FILLER          PIC  X(44).                      ┘
01  DSP CONTROL-AREA.                                     ┐  COMMUNICATION FUNCTION
    03   DSP-DEST-1     PIC  X(8).                        ┘  RELATED AREA DEFINITION
         ⋮
    EXEC SQL BEGIN DEXLARE SECTION END-EXEC.              ┐  DATABASE INPUT/OUTPUT
01 RDBREC              PIC  X(1).                            AREA (HOST VARIABLE)
    EXEC SQL DEXLARE  SECTION END-EXEC.                   ┘
LINKAGE-SECTION.
01  LK-01.                                                ┐  RECORD DEFINITION OF
    02   LK-01-01     PIC  X(1).                             LINKAGE AREA
    02   LK-01-02     PIC  9(4).                         ┘
         ⋮
```

Fig. 28

```
PROCEDURE DIVISION.
  READY.
  OPEN INPUT INFILE.                              → DATABASE ACCESS RELATED STATEMENT        ⇒ COMPUTER CONTROL
  OPEN OUTPUT OUTFILE.                            → FILE ACCESS RELATED STATEMENT            ⇒ COMPUTER CONTROL
  OPEN I-O    DSP-FILE.                           → FILE ACCESS RELATED STATEMENT            ⇒ COMPUTER CONTROL
  READ DSP-FILE.                                  → COMMUNICATION FUNCTION RELATED STATEMENT ⇒ COMPUTER CONTROL
    ...                                           → COMMUNICATION FUNCTION RELATED STATEMENT ⇒ COMPUTER CONTROL

READ INFILE AT END GO TO LABEL END.             → FILE ACCESS RELATED STATEMENT            ⇒ COMPUTER CONTROL
    ...
  EXEC SQL DEFINE CURSOR ... END EXEC.            → DATABASE ACCESS RELATED STATEMENT        ⇒ COMPUTER CONTROL
  GET ANY 'DBREC1'                                → DATABASE ACCESS RELATED STATEMENT        ⇒ COMPUTER CONTROL
    ...

IF WK-ENTYEAR  = ...                            → (CHECK) RECORD NAME FILE                 ⇒ TASK SPECIFICATION
  IF LK-01-01    = ...                            → (CHECK) LINKAGE AREA                     ⇒ TASK SPECIFICATION
  IF DBREC01     = ...                            → (CHECK) DATABASE INPUT/OUTPUT AREA       ⇒ TASK SPECIFICATION
  IF IN-ENTYEAR  = ...                            → (CHECK) INPUT FILE                       ⇒ TASK SPECIFICATION
  IF MENUREC-01  = ...                            → (CHECK) COMMUNICATION FUNCTION MESSAGE AREA ⇒ TASK SPECIFICATION
  IF DSP-DEST 1  = ...                            → (CHECK) COMMUNICATION FUNCTION RELATED AREA ⇒ COMPUTER CONTROL
    ...

MOVE ZERO TO WK-ENTYEAR                         → (UPDATE) RECORD NAME FILE                ⇒ TASK SPECIFICATION
  MOVE ZERO TO LK-01-01                           → (UPDATE) LINKAGE AREA                    ⇒ TASK SPECIFICATION
  MOVE ZERO TO DBREC01                            → (UPDATE) DATABASE INPUT/OUTPUT AREA      ⇒ TASK SPECIFICATION
  MOVE ZERO TO OUT ENTYEAR                        → (UPDATE) OUTPUT FILE                     ⇒ TASK SPECIFICATION
  MOVE ZERO TO MENUREC-01                         → (UPDATE) COMMUNICATION FUNCTION MESSAGE AREA ⇒ TASK SPECIFICATION
  MOVE ZERO TO DSP-DEST 1                         → (UPDATE) COMMUNICATION FUNCTION RELATED AREA ⇒ COMPUTER CONTROL
    ...

MODIFY 'DBREC1'                                 → DATABASE ACCESS RELATED STATEMENT        ⇒ COMPUTER CONTROL
    ...
  WRITE MENUREC.                                  → COMMUNICATION FUNCTION RELATED STATEMENT ⇒ COMPUTER CONTROL
    ...
  WRITE OUTREC.                                   → FILE ACCESS RELATED STATEMENT            ⇒ COMPUTER CONTROL
    ...
FINISH.
  CLOSE INFILE OUTFILE.                           → DATABASE ACCESS RELATED STATEMENT        ⇒ COMPUTER CONTROL
                                                  → FILE ACCESS RELATED STATEMENT            ⇒ COMPUTER CONTROL
  CLOSE DSP-FILE.                                 → COMMUNICATION FUNCTION RELATED STATEMENT ⇒ COMPUTER CONTROL
```

Fig. 29

APPARATUS FOR ANALYZING THE TASK SPECIFICATION (BUSINESS RULE SPECIFICATION) OF A SOURCE PROGRAM

This application is a continuation of 08/301,960 filed Sep. 7, 1994 now abandoned.

BACKGROUND OF THE INVENTION

1. Field of the Invention

This invention pertains to an apparatus for analyzing the task specification of a source program, for analyzing the processing content of an existing source program, and for outputting an analysis result.

2. Description of the Related Art

A computer system needs to have its software rebuilt when it has a specification change e.g. when it has changed its specification pursuant to an update of the mainframe. In rebuilding software, it is necessary to fully understand existing software, particularly the processing content of an existing source program. This requires work of sorting and analyzing the procedures of an existing source program. Generally, a source program comprises a task specification part for processing data items having an external interface (e.g. performing for the data item an input/output process or a "check process") and a computer control part for performing a file access related command process and other processes dependent on the OS (Operating System). Recently, it has become more prevalent to use a CASE (Computer Aided Software Engineering) tool for enhancing the efficiency of generating a source program. However, the CASE tool is not yet very effective in rebuilding software.

As described above, the prior art requires a human operator, such as a user and a system engineer, to manually extract from a source program a task specification part and a computer control part in rebuilding software. That is, the human operator sorts and extracts data necessary in rebuilding software through the analysis and judgment of an individual procedure by giving consideration to the global configuration of the listing of a source program. Thus, rebuilding software demands a high workload from a human operator, and rewriting the source program is very labor intensive.

SUMMARY OF THE INVENTION

An object of the invention is to enhance the efficiency in rebuilding a source program through a reduction of workload by automatically extracting and outputting necessary data.

In this invention, a data item relation defined in a source program is extracted from the source program of a program run by a computer system, and, based on the extracted data item relation, statement data regarding a computer control and statement data regarding a task specification are extracted from the source program to be outputted separately, thereby reducing the workload of a human operator in rebuilding software.

Further, this invention enables everyone to easily ascertain the concrete content of a "check process" through the addition of a task nomenclature inputted by a human operator for a condition extracted and condensed to eliminate the duplication from the statements in the source program.

A feature of the present invention resides in an apparatus for analyzing the task specification of a source program comprising a data item relation extraction unit for extracting from the source program of a program run in a computer system a data item relation defined in the source program and a computer control/task specification data extraction unit for extracting for an output from the source program data on a statement regarding a computer control and data on a statement regarding a task specification, based on the data item relation extracted by the data item relation extraction unit.

BRIEF DESCRIPTION OF THE DRAWINGS

One skilled in the art can easily understand additional features and objects of this invention from the attached drawings and the description of a preferred embodiment. In the drawings:

FIG. 3 is an explanatory diagram, showing a condition name condition;

FIG. 4 is a list, showing a source program 100 used as an analysis object in this embodiment;

FIGS. 5A to 5B are format diagrams, showing the format of a data item relation file 120F shown in FIG. 2 having as its element a data item relation 120 extracted by a data item relation extraction unit 110;

FIG. 8 is a format diagram, showing the format of a simple condition extraction file 121F shown in FIG. 2 having as its element a simple condition 121 extracted by a simple condition extraction unit 111;

FIG. 9 is a first part of explanatory diagrams, showing in a two-part series a method of extracting a hierarchical condition;

FIGS. 10A to 10C are second parts of explanatory diagrams, showing in a two-part series a method of extracting a hierarchical condition;

FIG. 12 is a format diagram, showing the format of a complex condition extraction file 122F shown in FIG. 2 having as its element a complex condition 122 extracted by a complex condition extraction unit 112;

FIG. 14 is a format diagram, showing the format of a simple condition condensation file 123F shown in FIG. 2 having as its element a condensed simple condition 123 condensed by a simple condition condensation unit 113;

FIG. 15 is an explanatory diagram, showing a method of condensing a subscripted data item;

FIG. 17 is a format diagram, showing the format of a complex condition condensation file 124F shown in FIG. 2 having as its element a condensed complex condition 124 condensed by a complex condition condensation unit 114;

FIGS. 18A to 18B are format diagrams, showing the format of a task nomenclature dictionary 125D shown in FIG. 2 having as its element a task nomenclature 125 and generated by a task nomenclature (business terminology) input unit 115;

FIG. 19 is a format diagram, showing the format of a record name file 126F shown in FIG. 2 having as its element a record name 126 and generated by a record name input unit 116 (not shown);

FIG. 22 is a format diagram, showing the format of a computer control/task specification data file 127F shown in FIG. 2 generated by a computer control/task specification data extraction unit 117;

FIG. 23 is a format diagram, showing the format of a computer control/task specification data list 127L shown in FIG. 2 generated by a computer control/task specification data extraction unit 117;

FIG. 24 is a format diagram, showing the format of a task nomenclature dictionary 125D shown in FIG. 2 having as its element task nomenclature 125 to be attached to a hierarchical condition shown in FIG. 9;

FIG. 25 is a format diagram, showing the format of a computer control/task specification data list 127L shown in FIG. 2 generated by a computer control/task specification data extraction unit 117 by attaching to a hierarchical condition shown in FIG. 9 a task nomenclature 125 of a task nomenclature dictionary 125D shown in FIG. 24;

FIG. 27 is a format diagram, showing the format of data inputted to a CASE tool 1300 shown in FIG. 26;

FIG. 28 is a first part of lists, showing in a two-part series a source program 100 used as another analysis object in this embodiment, combined with a comment thereto; and FIG. 29 is a second part of lists, showing in a two-part series a source program 100 used as another analysis object in this embodiment.

DESCRIPTION OF THE PREFERRED EMBODIMENT

Figure 1:
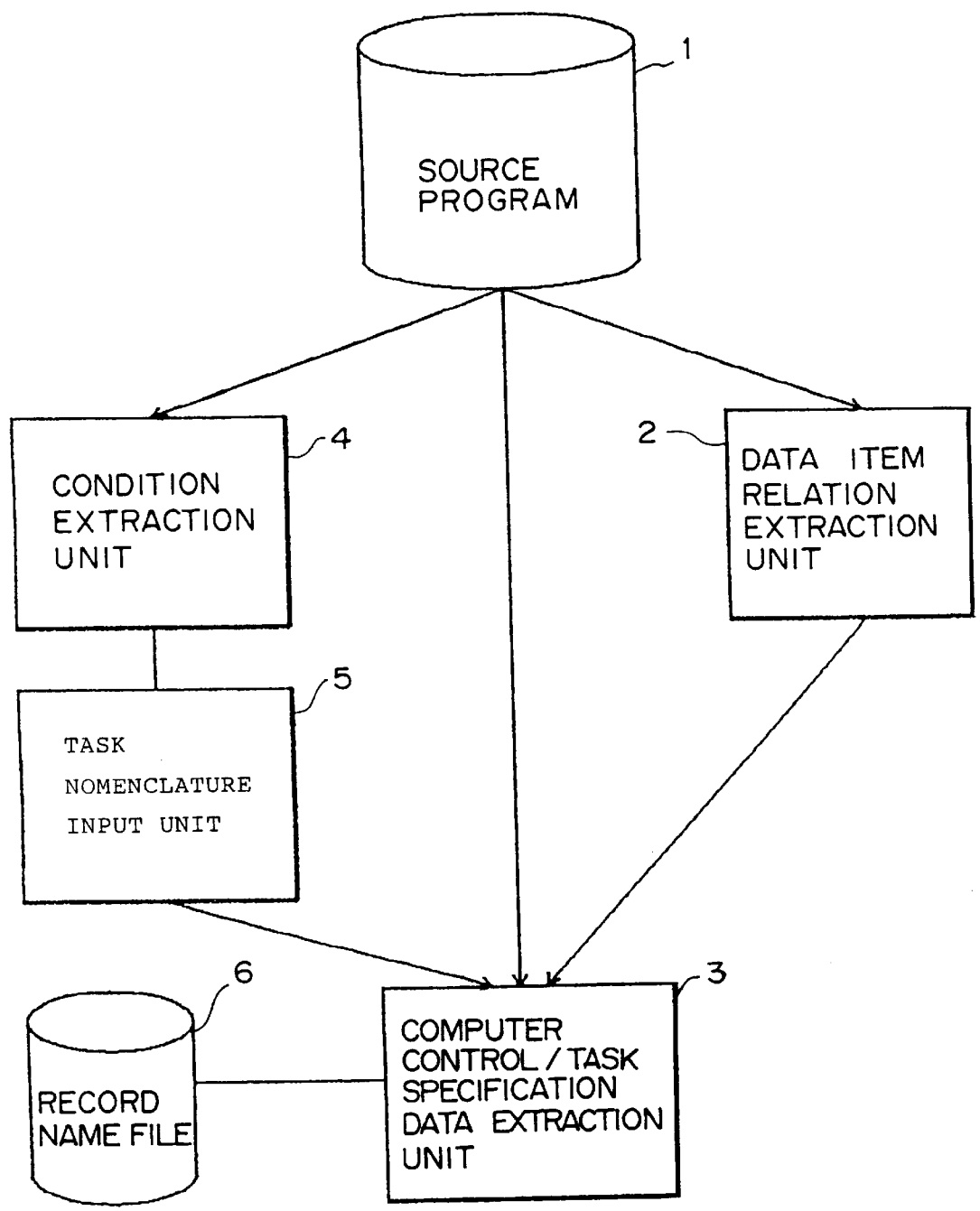
FIG. 1 is a block diagram, showing an underlying principle of this invention.

FIG. 1 is a block diagram, showing an underlying principle of this invention.

This invention pertains to rebuilding a source program 1 of a computer system.

A data item relation extraction unit 2 extracts from the source program 1 of a program run by the computer system a data item relation defined in the source program 1.

A condition extraction unit 4 extracts from a statement in the source program 1 a condition, and condenses the same conditions. A simple condition is a condition e.g. described by a comparative operator, and a complex condition is a combination of plural simple conditions.

A task nomenclature input unit 5 attaches to a condition extracted by the condition extraction unit 4 a task nomenclature appropriate for its task. For instance, a human operator inputs the task nomenclature.

A record name file 6 stores the name of a record to which a data item to be extracted as a task specification belongs. A human operator also inputs a record name.

A computer control/task specification data extraction unit 3, based on a data item relation extracted by the data item relation extraction unit 2, extracts from the source program 1 statement data regarding a computer control and statement data regarding a task specification and outputs them.

As well, the computer control/task specification data extraction unit 3, based on a data item relation extracted by the data item relation extraction unit 2 and a record name stored in the record name file 6, extracts from the source program 1 statement data regarding a computer control and statement data regarding a task specification and outputs them.

Further, the computer control/task specification data extraction unit 3, based on a data item relation extracted by the data item relation extraction unit 2 and a record name stored in the record name file 6, extracts from the source program 1 a statement regarding a computer control and a statement regarding a task specification, and outputs, of the statements regarding the task specification, a statement using a condition extracted by the condition extraction unit 4 by relating to it a task nomenclature designated by the task nomenclature input unit 5.

On rebuilding the source program 1, the data item relation extraction unit 2 extracts, for example, the name of a data item defined in the source program 1, the name of its section, the name of its record, and a usage purpose. Then, the computer control/task specification data extraction unit 3 extracts as a statement regarding a task specification a statement in the source program 1 for performing an input check process or an output setting process on a data item in a group of data items having an external interface with another program or with an external peripheral device. Also, the computer control/task specification data extraction unit 3 extracts as a statement regarding computer control a statement for performing a file access related process. And the computer control/task specification data extraction unit 3 classifies such extracted statements into those regarding a task specification and those regarding a computer control. As well, the computer control/task specification data extraction unit 3 performs a file output by combining an extracted statement with, for example, the line number of the statement and a record to which the currently used data item belongs. Finally, the computer control/task specification data extraction unit 3 performs a list output by relating the extracted statement to the record name and a task nomenclature designated by the task nomenclature input unit 5.

Hence, a reference to extracted data in the file or the list outputted by the computer control/task specification data extraction unit 3 simplifies an input work to a CASE tool, thereby reducing the workload of a human operator in rebuilding the source program 1.

Figure 2:
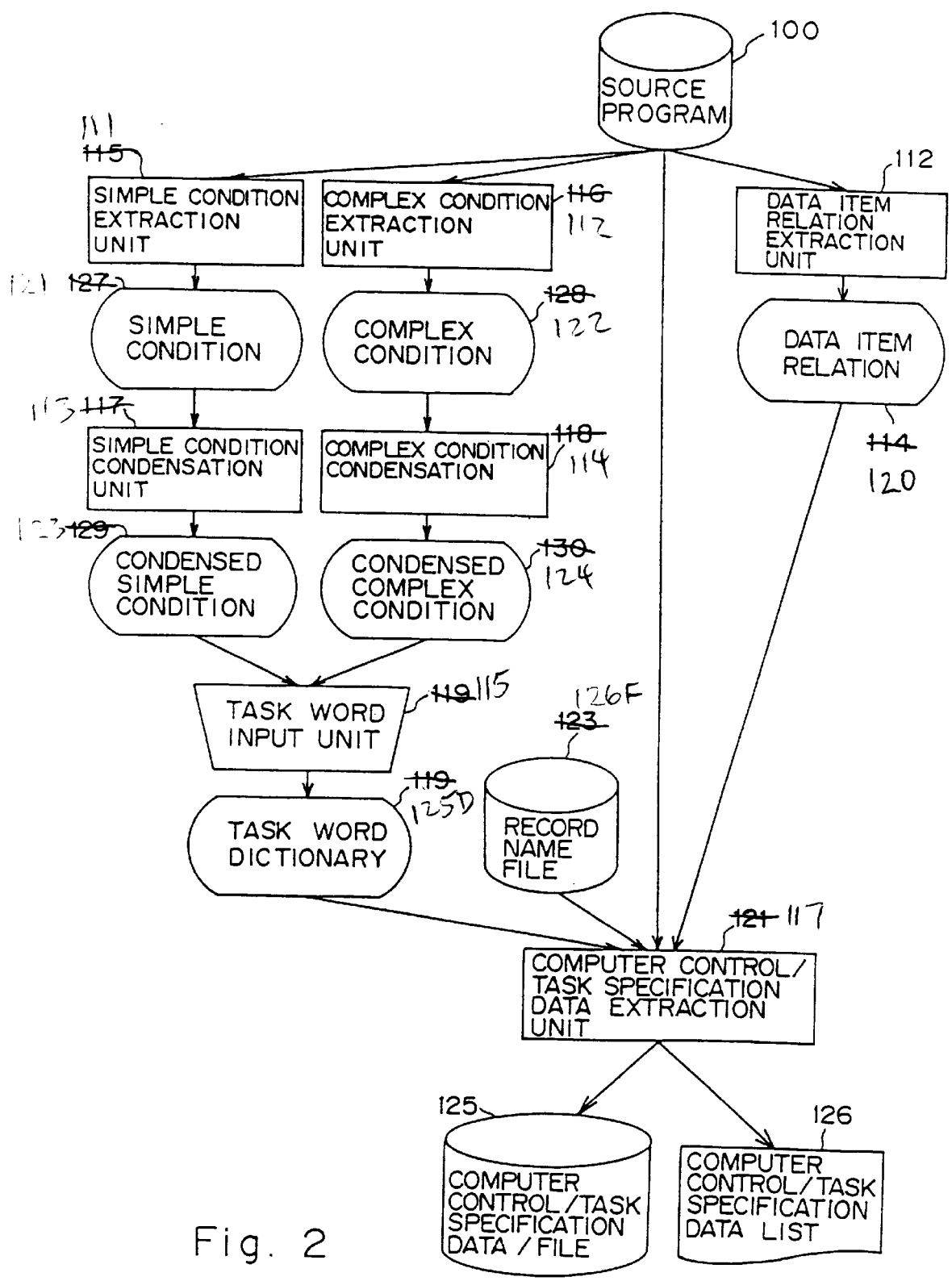
FIG. 2 is a block diagram, showing a system configuration in an embodiment of this invention.

FIG. 2 is a block diagram, showing a system configuration in an embodiment of this invention.

A source program 100 is the analysis object of a task specification. The source program 100 in this embodiment is written in COBOL (Common Business Oriented Language).

Described below in (0) through (7) are the outlines of respective components shown in FIG. 2.

(0) A data item relation extraction unit 110 (Refer to FIGS. 5A to 5B.)

A data item relation extraction unit 110 analyzes the source program 100, and extracts as a data item relation 120 data related to a data item defined in the "DATA DIVISION." of the source program 100. The data item relation 120 describes the following relations:

{a} The name of a data item. (data item name)

{b} The name of a section to which a defined data item belongs. (section name)

{c} The name of a record to which a data item belongs. (record name)

{d} The usage purpose of a data item. (usage purpose)
This classifies the type of area to which a data item belongs into a database area, a file input/output area, a communication function message area, communication function related area, and other area.

{e} The file name defined by an FD (File Description) phrase in "FILE SECTION." and the name of a record to which the file having the file name belongs to.

{f} The open mode of a file. "INPUT" designates an input file, and "OUTPUT" designates an output file.

{1} A simple condition extraction unit 111 (Refer to FIG. 6 through 9, and FIGS. 10A to 10C.)

A simple condition extraction unit 111 extracts a simple condition 121 described in the source program 100, and, at the same time, a simple condition 121 forming a complex condition 122. The simple condition extraction unit 111 extracts the following simple conditions 121 in a form similar to a comparative condition for their later condensation.

{a} A comparative condition in each of IF, EVALUATE, PERFORM and SEARCH statements.

{b} A condition name condition (Refer to FIG. 3.)

Figure 11:
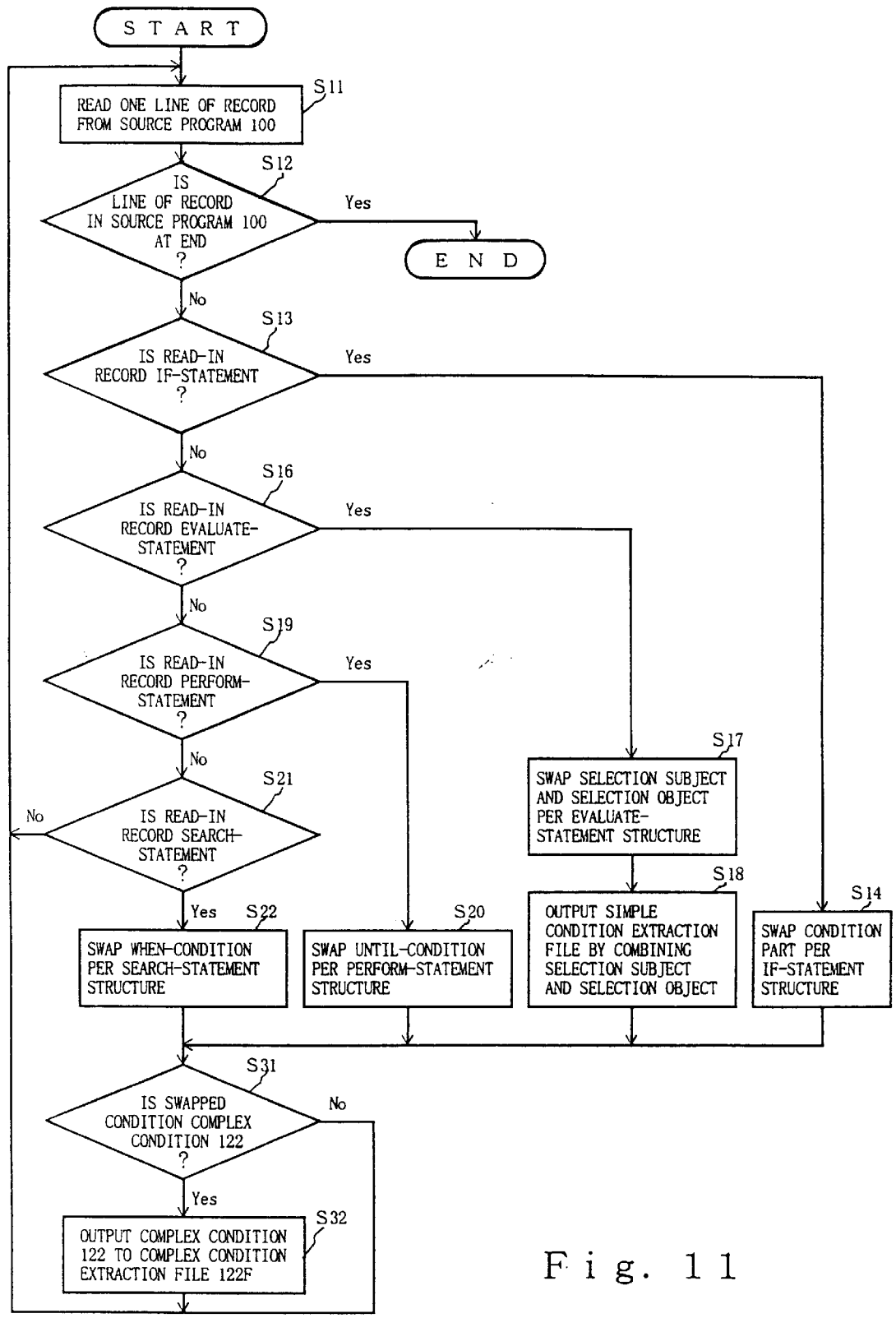
FIG. 11 is a flowchart, showing the operation of a complex condition extraction unit 112 shown in FIG. 2.

{2} A complex condition extraction unit 112 (Refer to FIG. 11 and FIG. 12.)

A complex condition extraction unit 112 extracts complex condition 122 described in source program 100, together with a logical operator combining a plurality of simple conditions 121. The complex condition extraction unit 112 extracts the following complex conditions 122 in a form similar to a comparative condition for their later condensation.

{a} A comparative condition in each of IF, EVALUATE, PERFORM and SEARCH statements.

{b} A condition name condition (Refer to FIG. 3.)

Figure 13:
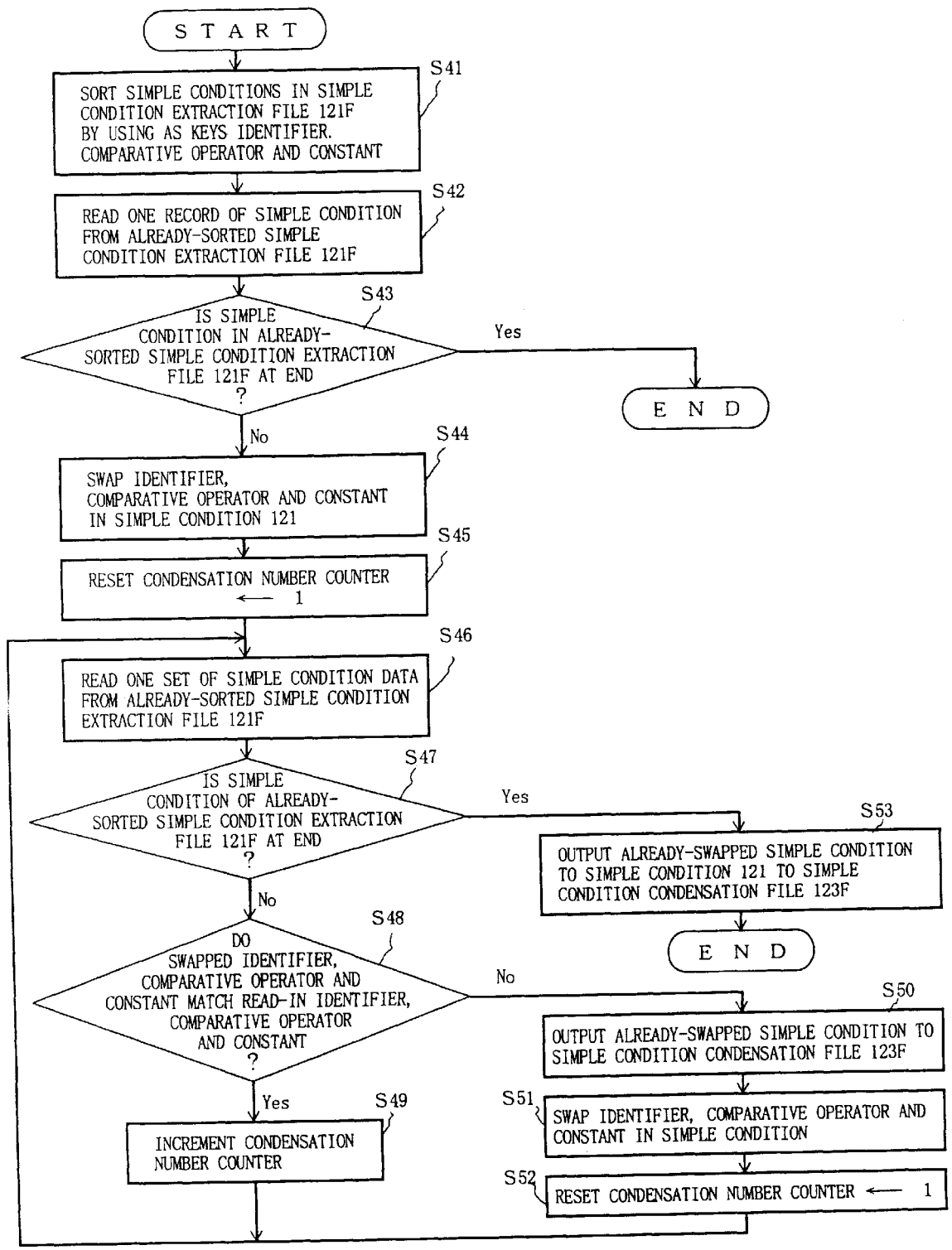
FIG. 13 is a flowchart, showing the operation of a simple condition condensation unit 113 shown in FIG. 2.

{3} A simple condition condensation unit 113 (Refer to FIG. 13, FIG. 14 and FIG. 15.)

A simple condition condensation unit 113 condenses the same simple conditions 121 extracted by the simple condition extraction unit 111 into a single condensed simple condition 123 by using as keys a comparative operator as well as the left side and the right side of the comparative operator. Also, the simple condition condensation unit 113 counts the appearance number of each simple condition 121, while performing a condensation. Then, the simple condition condensation unit 113 generates a simple condition condensation file 123F comprising a condensed simple condition 123 and its appearance number, i.e. its number of times appearing as a simple condition 121.

Figure 16:
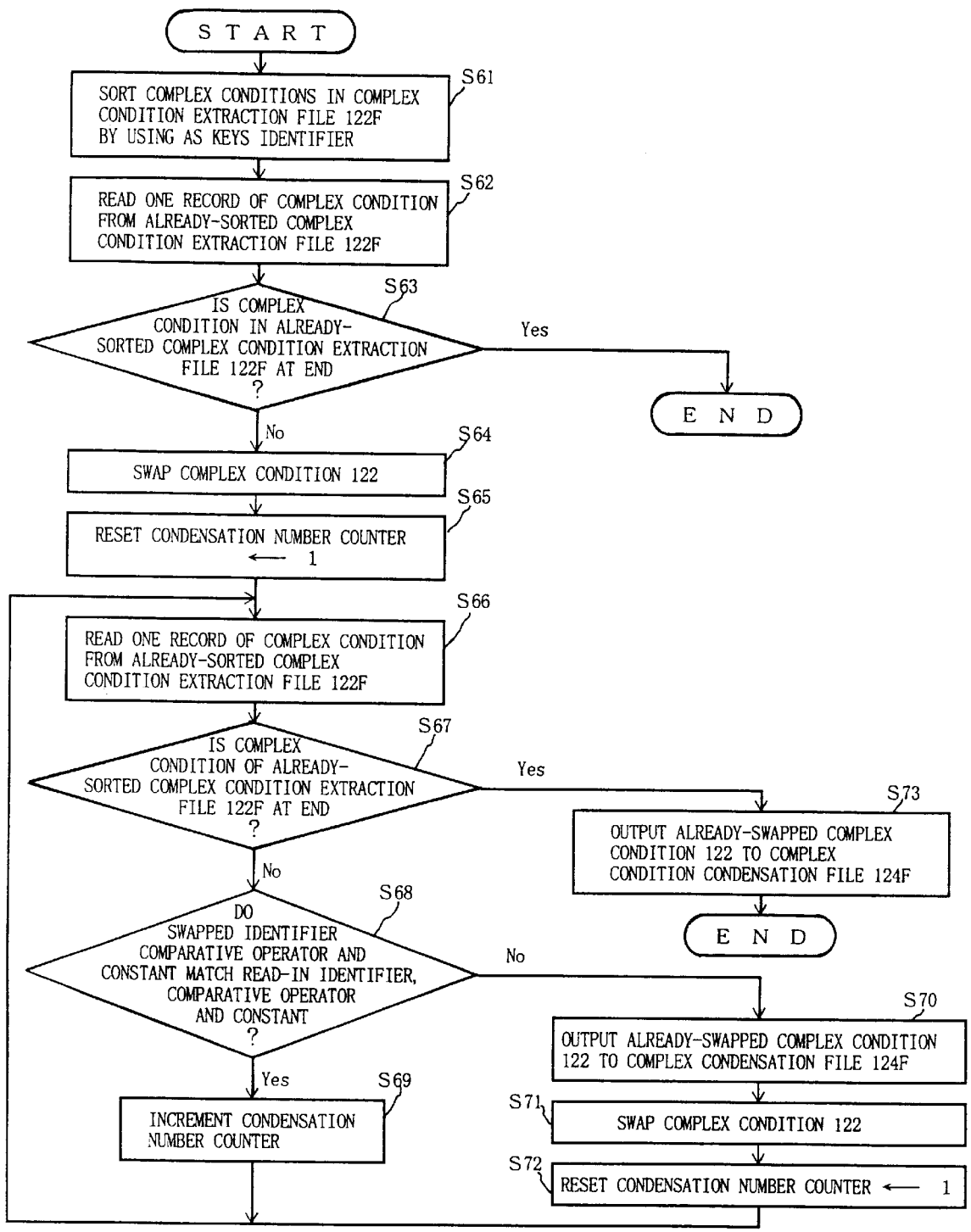
FIG. 16 is a flowchart, showing the operation of a complex condition condensation unit 114 shown in FIG. 2.

{4} A complex condition condensation unit 114 (Refer to FIG. 16 and FIG. 17.)

A complex condition condensation unit 114 condenses the same complex conditions 122 extracted by the complex condition extraction unit 112 into a single condensed complex condition 124 by using as keys a comparative operator, the left side and the right side of the comparative operator, and a logical operator. Also, the complex condition condensation unit 114 counts the appearance number of each complex condition 122, while performing a condensation. Then, the complex condition condensation unit 114 generates a complex condition condensation file 124F comprising a condensed complex condition 124 and its appearance number, i.e. its number of times appearing as a complex condition 122.

{5} A task nomenclature input unit 115 (Refer to FIGS. 18A and 18B, FIG. 24 and FIG. 25.)

A task nomenclature input unit 115 has a human operator manually input a task nomenclature 125 each having a concrete meaning corresponding to a condensed simple condition 123 and a condensed complex condition 124 condensed by the simple condition condensation unit 113 and the complex condition condensation unit 114, thereby generating a task nomenclature dictionary 125D.

Figure 19:
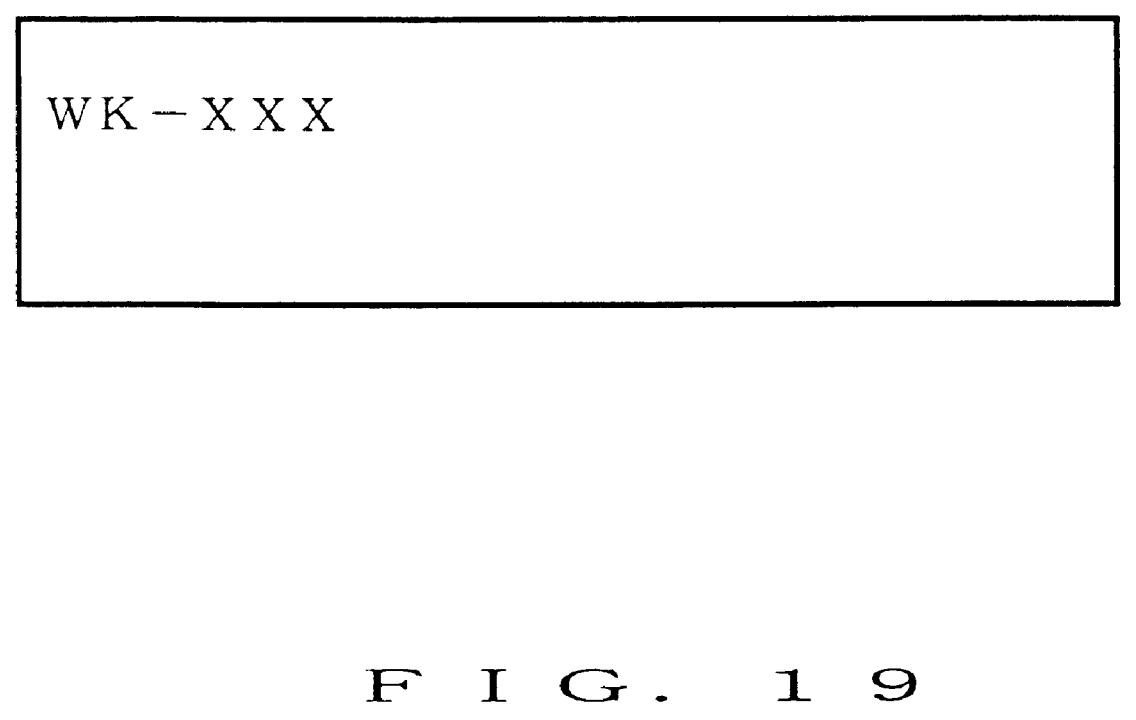

{6} A record name input unit 116 (Refer to FIG. 19.)

A record name input unit 116 (not shown) is a data processor having a human operator input as a record name the name of a record to which a data item, having no external interface, to be extracted as "task specification" belongs and has a record name file 126F store the record name.

{7} A computer control/task specification data extraction unit 117 (Refer to FIG. 20 through FIG. 23.)

A computer control/task specification data extraction unit 117, based on a data item relation 120 extracted by the data item relation extraction unit 110 and stored in the data item relation file 120F and the record name stored in the record name file 126F, analyzes the source program 100 and extracts from the source program 100 the line number of a statement performing a "computer control" process and the line number of a statement performing a "task specification" process. The computer control/task specification data extraction unit 117 extracts:

{a} as a "task specification", a "check process" and an "update process" for an item defined in "LINKAGE SECTION.";

{b} as a "task specification", a "check process" and an "update process" for a database input/output area;

{c} as a "task specification", a "check process" for a file input/output area of a file opened in an input mode and an update mode;

{d} as a "task specification", an "update process" for a file input/output area of a file opened in an output mode and an update mode;

{e} as a "task specification", a "check process" and an "update process" for a communication function message area;

A communication function message area is an area for storing input data from a display terminal and a card reader terminal and for setting output data to a display terminal and a printer terminal.

Because the communication function message area stores input data from an input terminal and output data to an output terminal, it is appropriate to treat as a "task specification" a "check process" and an "update process" for a communication function message area.

{f} as a "computer contro,", a "check process" and an "update process" for a communication function related area;

A communication function related area is an area for programming data for controlling a communication function either online or offline. Such data include, inter alia, a destination type (a display terminal, a card reader terminal, a printer terminal, etc.) and a destination name (work station name, logical destination name, etc.).

Because the communication function related area stores data for controlling communication functions, such as the exchange of input/output data with an input/output terminal, it is appropriate to treat as a "computer control" a "check process" and an "update process" for a communication function related area.

{g} as a "computer control", a file access related command, a communication function related command and a database access related command in each of OPEN, READ, WRITE, CLOSE and other statements;

The communication function related command is a command for inputting a message from an input terminal and for outputting a message to an output terminal.

{h} as a "task specification", a "check process" and an "update process" for the record of a record name stored in the record name file 126F and for a data item belonging to the record.

A "check process" and an "update process" in {a} through {h} respectively represent the following processes.

A "check process" is a process of comparing the value of a data item by using a comparative condition in each of IF, EVALUATE, PERFORM and SEARCH statements.

An "update process" is a process of setting the value to a data item by using a command in each of MOVE, COMPUTE and other statements.

Then, the computer control/task specification data extraction unit 117 generates for output a computer control/task specification data file 127F storing extracted computer control/task specification data in a predetermined format. Further, the computer control/task specification data extraction unit 117 generates for output a computer control/task specification data list 127L storing in a table format comment data comprising "computer control" and "task specification", as well as a task nomenclature 125 to be superimposed on the line corresponding to the statement in a list of the source program 100.

FIG. 3 is an explanatory diagram, showing a condition name condition.

As explained earlier in (1) and (2) in the description of FIG. 2, the simple condition extraction unit 111 and the complex condition extraction unit 112 uses {a} a comparative condition in each of IF, EVALUATE, PERFORM and SEARCH statements and {b} condition name condition, on extracting a simple condition 121 and a complex condition 122.

A condition name condition is a COBOL-specific description, which means a condition designated by a condition name. FIG. 3 shows an example of such a description.

A condition name is a data item defined by a level number "88" in "DATA DIVISION.". In FIG. 3, "BBB" and "CCC" are condition names.

A condition variable is a data item defined by a level number "01" immediately before a level number "88". In FIG. 3, "AAA" is a condition variable.

A condition name condition is a comparative condition in each of IF, EVALUATE, PERFORM and SEARCH statements in a "PROCEDURE DIVISION.", designating a condition name. In FIG. 3, "BBB" in a statement "IF BBB", is a condition name condition, and is equivalent to "AAA= 001".

Such a use of a condition name condition can simplify the description of a condition, and ease a program revision. Besides, setting a condition name appropriate as the name of a condition brings about an added benefit of enabling a human operator to ascertain the meaning of a condition instantaneously.

FIG. 4 is a list, showing a source program 100 used as an analysis object in this embodiment.

Described below is the operation of the system of this embodiment by referring to the source program 100 shown in FIG. 4, which is written in COBOL.

It goes without saying that COBOL has the level number of a data item in "DATA DIVISION" represent the parent-child relation of a data structure. Also, a particular column in each line of statement gets the following data. A first column through a sixth column is a sequential number area, where the line number of a statement is written in. A seventh column is a marker area, where a continuation marker and a comment marker is written in. An eighth column through an eleventh column is an area A, where a DIVISION name, a SECTION name, a PARAGRAPH name, a level specifier e.g."FD", a level number "01" and a program end is written in. An twelfth column through seventy-second column is an area B, where level number "02" and below, as well as descriptive items are written in.

In A area, a level specifier "FD" (an abbreviation of "File Description") represents a file and level number "01" represents a record.

In B area, a level number "02" or below represents a record comprising a data item, such as a group item and an elementary item.

FIG. 5A is a format diagram, showing the format of a data item relation file 120F shown in FIG. 2 having as its element a data item relation 120 extracted by a data item relation extraction unit 110.

The data item relation extraction unit 110 receives the entirety of the source program 100, and examines the content of "FILE SECTION." and "WORKING-STORAGE SECTION." in "DATA DIVISION." by a level specifier "FD" and level numbers "01", "02", "03", etc., thereby extracting a data item relation 120 and generating a data item relation file 120F shown in FIG. 5A.

First, the data item relation extraction unit 110 extracts, from "FILE SECTION.", record "INREC" belonging to file "INFILE", the data item name "INREC-A" of a group item belonging to record "INREC", data item names "IN-ENTYEAR" and "IN-SERNO" of two elementary items forming group item "INREC-A", and data item names "IN-NAME" and "IN-SEC-CODE" of two other elementary items belonging directly to record "INREC". Also, the data item relation extraction unit 110 sets, for an extracted data item name, "FILE" in the "SECTION NAME" column and "file" in the "USAGE PURPOSE" column of the data item relation file 120F. Further, the data item relation extraction unit 110 sets, for all data items forming record "INREC", "INREC", as the name of a record to which these data items belong, in the "DATA ITEM NAME" column.

Second, the data item relation extraction unit 110 extracts, from "FILE SECTION.", record "OUTREC" belonging to file "OUTFILE", the data item name "OUTREC-A" of a group item belonging to record "OUTREC", data item names "OT-ENTYEAR" and "OT-SERNO" of two elementary items forming group item "OUTREC-A", and data item names "OT-NAME" and "OT-SEC-CODE" of two other elementary items belonging directly to record "OUTREC". Also, the data item relation extraction unit 110 sets, for an extracted data item name, "FILE" in the "SECTION NAME" column and "file" in the "USAGE PURPOSE" column of the data item relation file 120F. Further, the data item relation extraction unit 110 sets, for all data items forming record "OUTREC", "OUTREC", as the name of a record to which these data items belong, in the "DATA ITEM NAME" column.

Because "FILLER" in line numbers "000220" and "000300" having level number "02" is a null item, which is not referred to, the data item relation extraction unit 110 does not extract "FILLER" as a data item.

Here, the "SECTION NAME" column uses "FILE" in capital letters as an abbreviation of a "FILE SECTION.", whereas "USAGE PURPOSE" column uses "file" in small letters as meaning a group of records in an ordinary sense, thus making a distinction between those two expressions.

Third, the data item relation extraction unit 110 analyzes "WORKING-STORAGE SECTION." as with "FILE SECTION.", and finds that "WORKING-STORAGE SECTION." has no files, but nonetheless two records "WK-XXX" and "WK-ERRCODE". Thus, the data item relation extraction unit 110 extracts, from "WORKING-STORAGE SECTION.", the data item name "WKREC-A" of a group item belonging to record "WK-XXX", data item names "WK-ENTYEAR" and "WK-SERNO" of two elementary items forming group item "WKREC-A", and data item names "WK-NAME" and "WK-SEC-CODE" of two other elementary items belonging directly to record "WK-XXX". Also, the data item relation extraction unit 110 sets, for an extracted data item name, "WORK" in the "SECTION NAME" column and "other" in the "USAGE PURPOSE" column of the data item relation file 120F. Further, the data item relation extraction unit 110 sets, for all data items forming record "WK-XXX", "WK-XXX", as the name of a record to which these data items belong, in the "DATA ITEM NAME" column.

Here, the "SECTION NAME" column uses "WORK" in capital letters as an abbreviation of a "WORKING-STORAGE SECTION.".

"WORKING-STORAGE SECTION." in "DATA DIVISION." designates a work area provided in a main memory. Yet, a work area is none of a database input/output area, a file input/output area, a communication function message area, and a communication function related area. Therefore, the data item relation extraction unit 110 sets "other" in the "USAGE PURPOSE" column for an extracted data item name.

Thus, the data item relation extraction unit 110 generates the data item relation file 120F shown in FIG. 5A.

Fourth, the data item relation extraction unit 110 extracts from "FILE SECTION." the names of files "INFILE" and "OUTFILE" by a level specifier "FD", and the names of records that belongs to these files "INREC" and "OUTREC" by level number "01". In addition, the data item relation extraction unit 110 searches "PROCEDURE DIVISION USING LK-A." to find the open modes of these files, and extracts a statement "OPEN INPUT INFILE." in line number "000500" and a statement "OPEN OUTPUT OUTFILE." in line number "000510", hence determining the open mode of file "INFILE" to be "INPUT" meaning an input mode, and the open mode of file "OUTFILE" to be "OUTPUT" meaning an output mode.

Thus, the data item relation extraction unit 110 generates the data item relation file 120F shown in FIG. 5B, based on the extracted data regarding an open mode.

It may be noted that the data item relation file 120F may have a format different than those shown in FIGS. 5A and 5B. The data item relation extraction unit 110 may omit "RECORD NAME" column shown in FIG. 5B by substituting a "PARENT NAME", i.e. a name of the parent to which a data item belongs, into "RECORD NAME" shown in FIG. 5A. Because this will allow FIG. 5A to show the correspondence between a record and its parent file, and no longer need to show such a correspondence.

Figure 6:
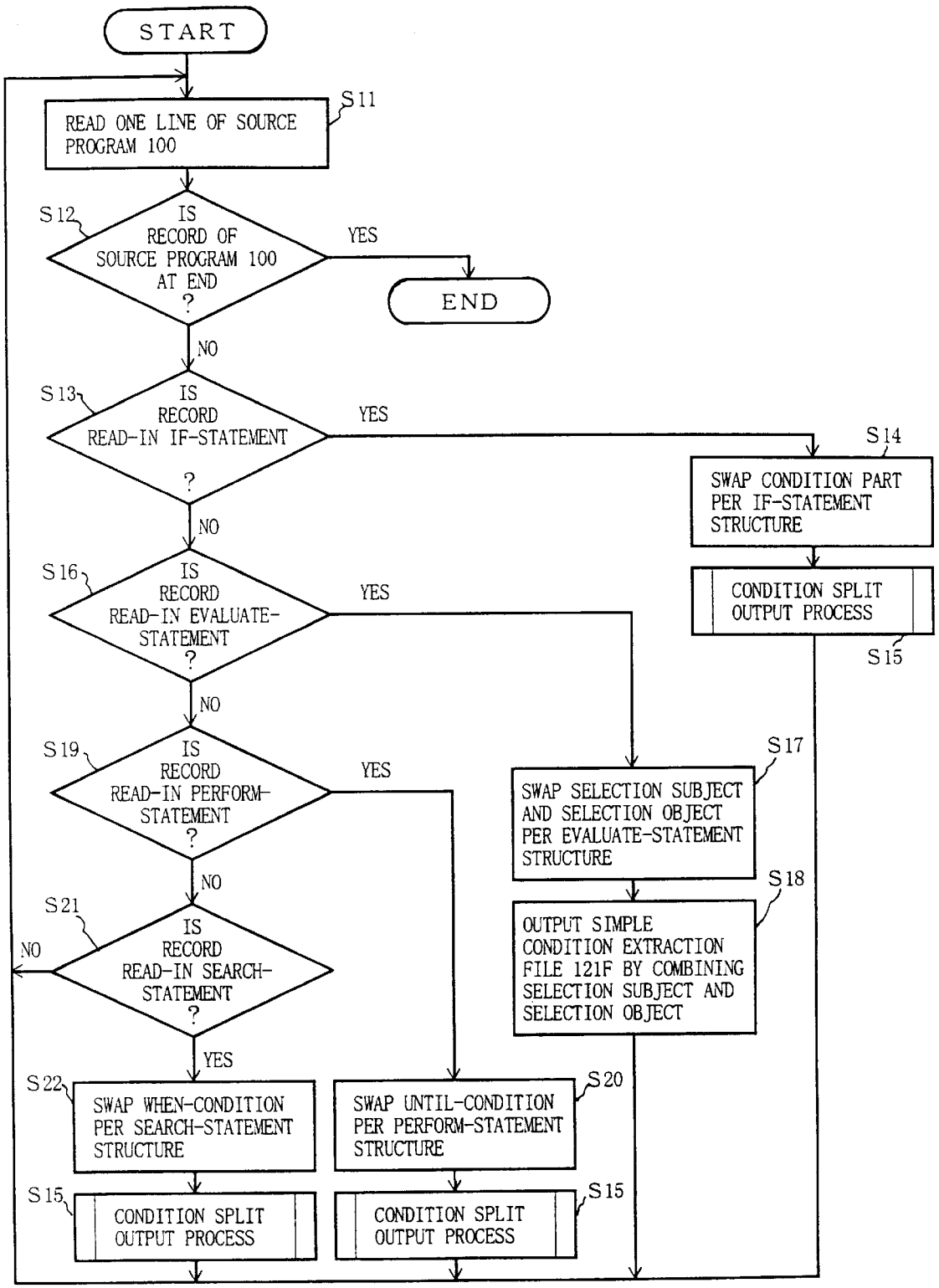
FIG. 6 is a flowchart, showing the operation of a simple condition extraction unit 111 shown in FIG. 2.

FIG. 6 is a flowchart, showing the operation of a simple condition extraction unit 111 shown in FIG. 2.

Described below in detail is the operation of a simple condition extraction unit 111.

First, the simple condition extraction unit 111 reads source program 100 sequentially from the head end line (head end record) in "PROCEDURE DIVISION." (S11), and determines whether or not the record indicates the end of the source program 100 (S12). COBOL combines steps S11 and S12 into a single READ statement.

If it is not an end record (S12, NO), the simple condition extraction unit 111 determines next whether or not the record is an IF statement (S13). If in fact the simple condition extraction unit 111 determines the record is an IF statement (S13, YES), the simple condition extraction unit 111 swaps its comparative condition to memory area (not shown) by referring to the statement structure (S14); and analyzes the swapped condition and extracts a simple condition 121, thereby performing a condition split output (S15).

The condition split output process S15 will be described later in detail.

If, on the other hand, the simple condition extraction unit 111 determines the record is not an IF statement (S13, NO), the simple condition extraction unit 111 determines whether the record has an EVALUATE statement (S16). If the simple condition extraction unit 111 determines the record is an EVALUATE statement (S16, YES), the simple condition extraction unit 111 extracts a selection subject and a selection object from the statement structure and temporarily swaps them to a memory area (not shown) (S17); and combines the selection subject with the selection object for an output to a simple condition extraction file 121F (not shown) (S18).

If the simple condition extraction unit 111 determines the record read in step S16 is not an EVALUATE statement (S16, NO), the simple condition extraction unit 111 determines next whether or not the record is a PERFORM statement (S19). If the simple condition extraction unit 111 determines the record is a PERFORM statement (S19, YES), the simple condition extraction unit 111 swaps an UNTIL condition to a memory area (not shown) by referring to the statement structure of a PERFORM statement (S20). Then, the simple condition extraction unit 111 performs a condition split output process S15, based on the swapped UNTIL condition.

As well, if the simple condition extraction unit 111 determines that the record is not a PERFORM statement (S19, NO), the simple condition extraction unit 111 determines whether or not the record is a SEARCH statement (S21). If the simple condition extraction unit 111 determines the record is a SEARCH statement (S21, YES), the simple condition extraction unit 111 swaps a WHEN condition to a memory area (not shown) by referring to its statement structure (S22). Then, the simple condition extraction unit 111 performs, based on the swapped WHEN condition, the condition split output process S15. If the simple condition extraction unit 111 determines the record is not a SEARCH statement (S21, NO), the simple condition extraction unit 111 reads the record in the next line by reverting to step S11.

The simple condition extraction unit 111 repeats the above procedure for all records in the line number sequence, until it determines in step S12 that it has read all records from "PROCEDURE DIVISION." in the source program 100 (S12, YES).

The simple condition extraction unit 111 obtains the simple condition extraction file 121F by filing the simple condition 121 extracted from the source program 100 shown in FIG. 4 in an extraction format shown in FIG. 8.

Additionally, the selection subject in an EVALUATE statement corresponds to a data name, and the selection object therein corresponds to a condition value. Accordingly, in a statement structure having statements "EVALUATE WK-A" and "WHEN '1'", the simple condition extraction unit 111 determines {1} "selection subject=WK-A" and {2} "selection object='1'".

Figure 7:
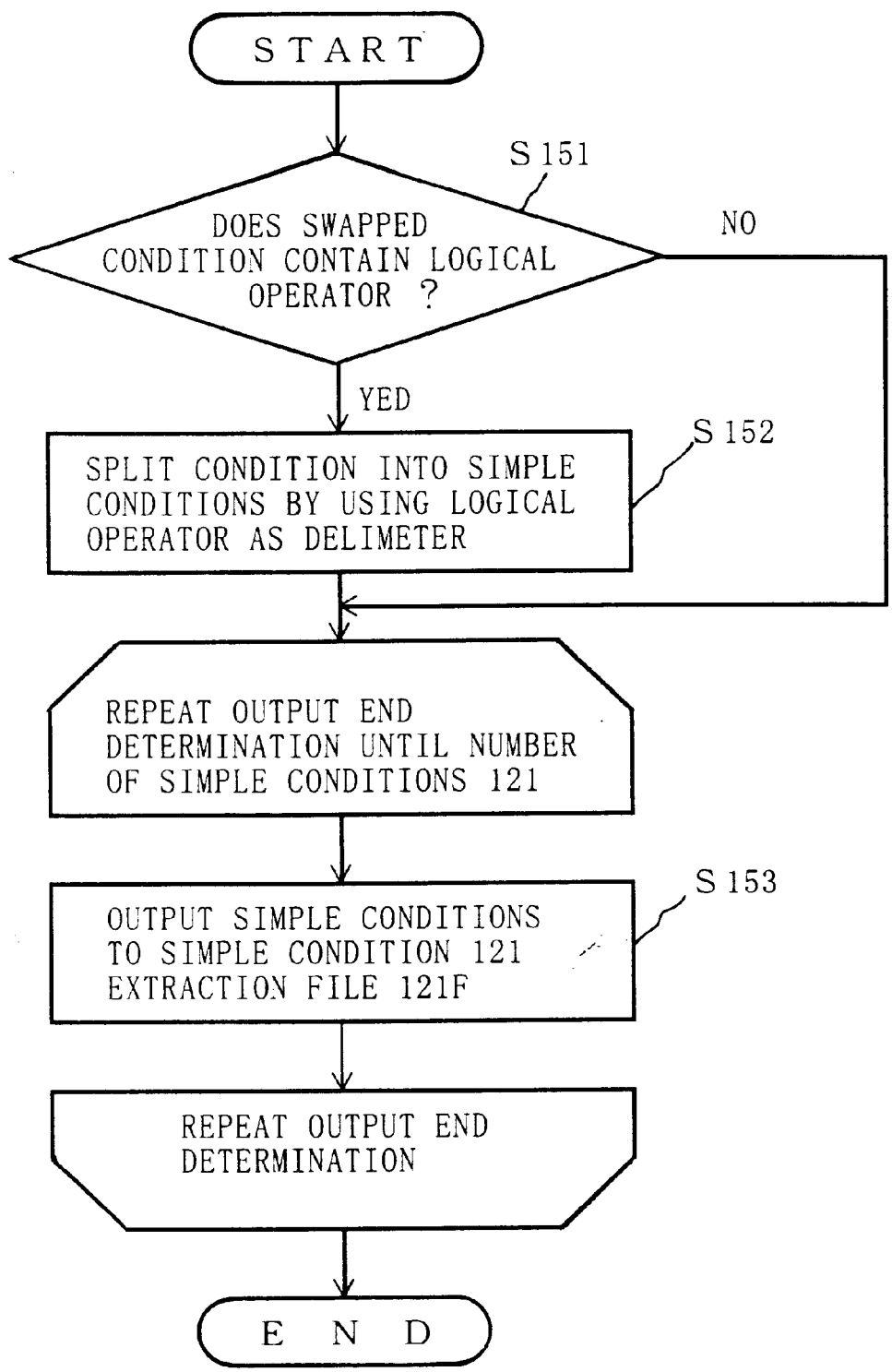
FIG. 7 is a flowchart, showing in detail a condition split output process S15 shown in FIG. 6.

FIG. 7 is a flowchart, showing in detail a condition split output process S15 shown in FIG. 6.

FIG. 8 is a format diagram, showing the format of a simple condition extraction file 121F having as its element a simple condition 121 extracted by a simple condition extraction unit 111 shown in FIG. 2.

Described below in detail is the operation of the condition split output process S15.

First, the simple condition extraction unit 111 reads out a condition (a comparative condition of an IF statement, an UNTIL condition of a PERFORM statement, and a WHEN condition of a SEARCH statement) swapped from the swap memory area, and determines whether or not the condition has a logical operator, i.e., the condition is a complex condition 122 (S151).

If the simple condition extraction unit 111 determines that the condition has a logical operator (S151, YES), the simple condition extraction unit 111, by using the logical operator as a delimiter, splits the complex condition 122 into plural simple conditions 121 (S152).

Then, the simple condition extraction unit 111 sequentially outputs the simple conditions 121 obtained in step S152 to the simple condition extraction file 121F (S153).

By repeating the process in step S153, the same number of times as the number of the simple conditions 121 obtained in step S152, the simple condition extraction unit 111 has the simple condition extraction file 121F store the simple condition 121 for a simple condition 121 and a corresponding number of simple conditions 121 for a complex condition 122.

Described below further about condition split output process S15 is an example of an IF statement "IF WK-SEC-CODE='1' AND IN-NAME=SPACE" in line number "000690" of the source program 100 shown in FIG. 4.

In the case of this IF statement, the simple condition extraction unit 111 swaps a complex condition 122 "WK-SEC-CODE='1' AND IN-NAME=SPACE. Then, the simple condition extraction unit 111 determines in step S151 that the condition has a logical operator "AND" (S151, YES); and, by using the logical operator "AND" as a delimiter, splits the swapped condition into two simple conditions 121 "WK-SEC-CODE='1'" and "IN-NAME=SPACE" (S152).

Further, the simple condition extraction unit 111 repeats the process of step S153 two times, and outputs the two simple conditions 121 "WK-SEC-CODE='1'" and "IN-NAME=SPACE" to the simple condition extraction file 121F shown in FIG. 8.

On the other hand, in a case that an IF statement has a statement structure of a simple condition 121 as in line number "000530", the simple condition extraction unit 111 determines NO in step S151; skips step S152 and performs step S153 only one time, thereby outputting the simple condition 121 to the simple condition extraction file 121F.

In the case of the source program 100 shown in FIG. 4, the simple condition extraction unit 111 performs the process for a comparative condition in each of IF statements in line numbers "000550", "000570", "000590" and "000690", and outputs to the simple condition extraction file 121F a content shown in FIG. 8. As well, although no explanation is made here, the simple condition extraction unit 111 outputs a simple condition 121 corresponding to a comparative condition in each of EVALUATE, PERFORM and SEARCH statements, by the condition split output process S15, to the simple condition extraction file 121F shown in FIG. 8.

FIG. 9 is a first part of explanatory diagrams, showing in a two-part series a method of extracting a hierarchical condition.

FIGS. 10A to 10C are second parts of explanatory diagrams, showing in a two-part series a method of extracting a hierarchical condition.

The source program 100 written in COBOL may have hierarchical conditions forming a nest structure. Even in such a case, the simple condition extraction unit 111 and the complex condition extraction unit 112 need to extract a simple condition 121 and complex condition 122, respectively.

Described below is a method by which the simple condition extraction unit 111 extracts a simple condition 121 from a nest structure, by referring to the examples shown in FIG. 9 and FIGS. 10A to 10C.

An EVALUATE statement has a SEARCH statement and an EVALUATE statement as its nests. To properly handle such a description, the simple condition extraction unit 111 allocates to a memory area (not shown) a hierarchical storage table 200 comprising a first hierarchy storage area 201 for a first hierarchy condition, a second hierarchy storage area 202 for a second hierarchy condition, a third hierarchy storage area 203 for a third hierarchy condition, etc., as shown in FIGS. 10A to 10C.

In a case of the source program 100 shown in FIG. 9, upon analyzing {5}"END-SEARCH", the simple condition extraction unit 111 detects an end for a SEARCH statement "SEARCH TBL-A" in the second hierarchy. In the meantime, the simple condition extraction unit 111 detects four WHEN conditions {1}, {2}, {3} and {4}. As shown in FIGS. 10A to 10C, the simple condition extraction unit 111 has the hierarchical storage table 200 store in the first hierarchy storage area 201 the content {1}"WK-A='1'" of the WHEN condition {1}"WHEN '1'" of an EVALUATE statement "EVALUATE WK-A" in the first hierarchy. Further, as shown in FIG. 10A, the simple condition extraction unit 111 has the hierarchical storage table 200 store in the second hierarchy storage area 202 sequentially from the head end three descriptions of WHEN conditions {2}"KEY-A='1'", {3}"KEY-A='2'",{4}"KEY-A='3'" of the SEARCH statement "SEARCH TBL-A" in the second hierarchy, which forms a nest of an EVALUATE statement "EVALUATE WK-A" in the first hierarchy. Then, as described above, upon detecting by {5}"END-SEARCH" the end of a SEARCH statement "SEARCH TBL-A" in the second hierarchy, by taking out from the second hierarchy storage area 202 three descriptions {2}"KEY-A='1'", {3}"KEY-A='2'" and {4}"KEY-A='3'" of the WHEN conditions of a SEARCH statement "SEARCH TBL-A" in the second hierarchy, the simple condition extraction unit 111 outputs them to the simple condition extraction file 121F, thereby deleting them from the second hierarchy storage area 202.

Further, upon reading {6} "WHEN '2'", the simple condition extraction unit 111 determines this is a WHEN condition of an EVALUATE statement "EVALUATE WK-A" in the first hierarchy. As shown in FIG. 10B, the simple condition extraction unit 111 has hierarchical storage table 200 store in the first hierarchy storage area 201 the content {6}"WK-A='2'" of WHEN condition {6}"WHEN '2'", immediately after the content {1}"WK-A='1'" of WHEN condition {1}"WHEN '1'" stored at the head end. Further, upon detecting two WHEN conditions {7}"WHEN '1'" and {8}"WHEN '2'" in an EVALUATE statement "EVALUATE WK-B" in the second hierarchy, by generating the contents {7}"WK-B='1'" and {8}"WK-B='2'" of these two WHEN conditions, the simple condition extraction unit 111 has the hierarchical storage table 200 store them sequentially from the head end in the second hierarchy storage area 202. Then, upon detecting by {9}"END-EVALUATE" the end of an EVALUATE statement "EVALUATE WK-B" in the second hierarchy, by taking out from the second hierarchy storage area 202 two contents {7}"WK-B='1'" and {8}"WK-B='2'" of the WHEN conditions of an EVALUATE statement "EVALUATE WK-B" in the second hierarchy, the simple condition extraction unit 111 outputs them to the simple condition extraction file 121F, thereby deleting them from the second hierarchy storage area 202.

Then, upon detecting by {10}"END-EVALUATE. " the end of an EVALUATE statement "EVALUATE WK-A" in the first hierarchy, as shown in FIG. 10C, by taking out from the second hierarchy storage area 202 two contents {1}"WK-A='1'" and {6}"WK-A='2'" of the WHEN conditions of an EVALUATE statement "EVALUATE WK-A" in the first hierarchy, the simple condition extraction unit 111 outputs them to the simple condition extraction file 121F, thereby deleting them from the first hierarchy storage area 201.

Thus, the simple condition extraction unit 111 consummates the extraction of a simple condition 121 from an EVALUATE statement forming a nest structure.

As described later, the complex condition extraction unit 112 extracts a complex condition 122 from an a nest structure by using the same procedure.

FIG. 11 is a flowchart, showing the operation of a complex condition extraction unit 112 shown in FIG. 2.

FIG. 12 is a format diagram, showing the format of a complex condition extraction file 122F having as its element a complex condition 122 extracted by a complex condition extraction unit 112 shown in FIG. 2.

Described below in detail is the operation of a complex condition extraction unit 112. Steps shown in FIG. 11 that are the same as those shown in FIG. 6 for the simple condition extraction unit 111 have the same step numbers.

How the operation of the complex condition extraction unit 112 shown in FIG. 11 differs from the operation of the simple condition extraction unit 111 shown in FIG. 6 is that the former has an additional step S31 for determining whether or not a condition in each of IF, EVALUATE, PERFORM and SEARCH statements is a complex condition 122, and the former need not split a complex condition 122 into a plurality of simple conditions 121.

Thus, to avoid duplicate explanations, an emphasis is put on the process in a different step. First, if the record is an EVALUATE statement(S16, YES), by referring to the statement structure, the complex condition extraction unit 112 extracts a selection subject and a selection object(S17). Then, the complex condition extraction unit 112 generates a condition by combining these two, and swaps the condition to a memory area (not shown) (S18). In case of a comparative condition in each of IF, PERFORM and SEARCH statements, as with the simple condition extraction unit 111, the complex condition extraction unit 112 swaps a comparative condition, an UNTIL condition or a WHEN condition to the memory area (S14,S20,S22).

Then, the complex condition extraction unit 112 determines whether or not the swapped condition is a complex condition 122(S31). If the complex condition extraction unit 112 determines that the swapped condition is a complex condition 122(S31, YES), the complex condition extraction unit 112 outputs the swapped condition as a complex condition 122 to the complex condition extraction file 122F (S32).

Through the above process, the complex condition extraction unit 111 outputs to the complex condition extraction file 122F the complex condition 122 "WK-SEC-CODE='1' AND IN-NAME=SPACE" written in an IF statement "IF WK-SEC-CODE='1' AND IN-NAME=SPACE" in line number "000690" extracted from the source program 100 shown in FIG. 4, in a format shown in FIG. 12.

FIG. 13 is a flowchart, showing the operation of a simple condition condensation unit 113 shown in FIG. 2.

Described below is the operation of a simple condition condensation unit 113.

First, a simple condition condensation unit 113 sorts simple conditions 121 stored in the simple condition extraction file 121F shown in FIG. 8, by using an identifier, a comparative operator and a constant as keys (S41).

After the sorting, simple condition condensation unit 113 restores a contiguous block of the same simple conditions 121 in the simple condition extraction file 121F.

Second, the simple condition condensation unit 113 reads the record of a single condition from the head end of the simple condition extraction file 121F after the sorting (S42). The simple condition extraction file 121F may not have even a single record of a simple condition 121. For this, in step S42, the simple condition condensation unit 113 determines whether or not the read record is "EOF" (End Of File) indicating the end of the simple condition extraction file 121F (S43). On determining that the read record is "EOF" (S43, YES), the simple condition condensation unit 113 immediately terminates its process.

On determining that the record read in step S42 is the record of a simple condition 121 (S43, NO), the simple condition condensation unit 113 swaps an identifier, a comparative operator and a constant in the simple condition 121 to a memory area (not shown) (S44). Then, the simple condition condensation unit 113 resets a condensation number counter to "1" (S45). The condensation number counter is used for tallying the appearance number of each simple condition 121.

Then, the simple condition condensation unit 113 reads the record of a single condition stored immediately after the record of the simple condition 121 read in step S42 from the simple condition extraction file 121F after the sorting (S46). Because the simple condition condensation unit 113 may read "EOF" at this time, it first determines whether or not the record is an "EOF", i.e. the end of the simple condition extraction file 121F after the sorting (S47). If the simple condition condensation unit 113 determines that the read record is the record of a new simple condition 121 rather than an "EOF" (S47, NO), the simple condition condensation unit 113 determines whether or not all of the identifier, the comparative operator and the constant swapped in a memory area match those of the simple condition 121 read in step S46 (S48).

Thereafter, if all these elements are the same, the simple condition condensation unit 113 increments the condensation number counter by one (S49), thereby looping back to process in step S46. Through this procedure, if the simple condition extraction file 121F after the sorting contiguously stores in a block the same simple conditions 121 from its head end identical simple conditions 121, the simple condition condensation unit 113 repeats processes in steps S46 through S49 by the number in the block minus one. On determining in step S48 that the simple condition 121 read out in step S46 is different to the simple condition 121 at head end swapped in step S44 (S48, NO), after having condensed the swapped simple conditions 121 by a value of the condensation number counter, the simple condition condensation unit 113 outputs it to the simple condition extraction file 121F (S50).

This procedure will allow the simple condition 121 contiguously stored from the head end of the simple condition extraction file 121F after the sorting to be stored in the simple condition condensation file 123F together with its appearance number.

On the other hand, on determining that two simple conditions 121 do not have all of their elements matched, i.e. on determining that two simple conditions 121 have at least one different element (S48, NO), the simple condition condensation unit 113 stores in the simple condition condensation file 123F by resetting the appearance number to "1" the simple condition 121 stored at the head end of the simple condition extraction file 121F (S50).

After step S50, the simple condition condensation unit 113 swaps the identifier, the comparative operator and the constant read this time in step S46 to the memory area (not shown) (S51). Then, the simple condition condensation unit 113 resets to "1" the condensation number counter (S52), thereby looping back to the process in step S46.

This procedure enables the simple condition condensation unit 113 other simple conditions 121 stored in the simple condition extraction file 121F to be condensed similarly.

Finally, on reading out an "EOF" in step S47 (S47, YES), the simple condition condensation unit 113 condenses the simple conditions 121 swapped in step S51 by the current value of the condensation number counter for an output to the simple condition condensation file 123F (S53).

FIG. 14 is a format diagram, showing the format of a simple condition condensation file 123F having as its element a condensed simple condition 123 condensed by a simple condition condensation unit 113 shown in FIG. 2.

Operation shown in FIG. 13 causes the simple condition condensation unit 113 to generate the simple condition condensation file 123F shown in FIG. 14 from the simple condition extraction file 121F shown in FIG. 8.

FIG. 15 is an explanatory diagram, showing a method of condensing a subscripted data item.

If the simple condition 121 has a subscripted data item either in the left side or the right side, the simple condition condensation unit 113 performs a condensation by a procedure shown in FIG. 15.

{1} If a subscript comprises only a constant or constants, the simple condition condensation unit 113 condenses simple conditions 121 by regarding even a subscript as a key. AAA(1), AAA(2) and BBB(1 1) fall into this category.

{2} If a subscript comprises an identifier or only partially comprises a constant, after once replacing the subscript to "*", the simple condition condensation unit 113 condenses the simple conditions 121 by using (*) as a key. AAA(IX-Y), BBB(1 IX-2) and BBB(IX-1 IX-2) fall into this category.

The complex condition condensation unit 114 uses this method of condensing subscripted data items in condensing complex conditions 122, which will be described later.

FIG. 16 is a flowchart, showing the operation of a complex condition condensation unit 114 shown in FIG. 2.

Described below is the operation of the complex condition condensation unit 114. The operation of the complex condition condensation unit 114 is almost identical to the operation of the simple condition condensation unit 113 shown in FIG. 13, while the complex condition condensation unit 114 condenses complex conditions 122, whereas the simple condition condensation unit 113 condenses simple conditions 121. The complex condition condensation unit 114 determines the sameness of complex conditions 122 by a match of all elements in a complex condition 122 (S66). Then, the complex condition condensation unit 114 has the condensation number counter tally the appearance number of each complex condition 122, thereby outputting respective complex conditions 122 and their appearance numbers to the complex condition condensation file 124F (S70).

FIG. 17 is a format diagram, showing the format of a complex condition condensation file 124F having as its element a condensed complex condition 124 condensed by a complex condition condensation unit 114 shown in FIG. 2.

The operation shown in FIG. 16 allows the complex condition condensation file 124F having a content shown in FIG. 17 to be generated from the complex condition extraction file 122F having a content shown in FIG. 12. In the case of this embodiment, no condensation is performed, because there is only one complex condition 122. However, if the source program 100 has a plurality of identical complex conditions 122, the operations shown in FIG. 16 causes them to be condensed to one.

Next, the task nomenclature input unit 115 creates the task nomenclature dictionary 125D by having a human operator input a task nomenclature 125 corresponding to each condition with reference to the contents of the simple condition condensation file 123F and the complex condition condensation file 124F generated by the simple condition condensation unit 113 and the complex condition condensation unit 114.

A task nomenclature 125 refers to a word concretely defining the "check process" for a data item by a comparative condition in each of IF, EVALUATE, PERFORM and SEARCH statements, such that a human operator can clearly understand the actual task contents. A human operator inputs a task nomenclature 125 to the task nomenclature dictionary 125D via the task nomenclature input unit 115 by watching a display screen.

FIGS. 18A to 18B are format diagrams, showing the format of a task nomenclature dictionary 125D shown in FIG. 2 having as its element a task nomenclature 125 and generated by a task nomenclature input unit 115.

FIG. 18A shows an example of a task nomenclature 125 for a simple condition 121.

The task nomenclature input unit 115 has a human operator input a task nomenclature 125 "WRONG YEAR INPUT" for a simple condition 121 "IN-ENTYEAR IS NOT NUMERIC" for checking whether or not numerical data are properly entered into data item "IN-ENTYEAR".

Thereafter, the task nomenclature input unit 115 has a human operator similarly input four task nomenclatures 125 "WRONG PERSONAL NAME INPUT", "WRONG DIVISION CODE INPUT", "WRONG EMPLOYEE NUMBER INPUT", and "TOKYO AREA" corresponding to respective tasks of four other simple conditions 121.

For instance, because in a condition "WK-SEC-CODE= '1'", a code '1' corresponds to "TOKYO AREA", the task nomenclature input unit 115 has a human operator input a task nomenclature 125 "TOKYO AREA" for this condition.

FIG. 18B shows an example of a task nomenclature 125 for a complex condition 122.

The task nomenclature input unit 115 has a human operator input a task nomenclature 125 "TOKYO SALES OFFICE" for a complex condition 122 "WK-SEC-CODE= '1' AND IN-NAME=SPACE".

Also, as described earlier, when the simple condition condensation unit 113 condenses simple conditions 121, a human operator inputs a task nomenclature 125 by referring to the appearance number shown in FIG. 14. Because the simple condition condensation unit 113 has condensed identical simple conditions 121, a human operator need only input a single task nomenclature 125 for obtaining the same effect of inputting the same task nomenclature 125 to all of these identical simple conditions 121. Additionally, a human operator can judge the effect of inputting a task nomenclature 125 by referring to the appearance number. For instance, if a condition is extracted a number of times, a human operator can prioritize the input of a task nomenclature 125 from the one having the most appearance number.

Also, as described earlier, on condensing subscripted data items, a human operator can review the source program 100 by referring to the condensed subscripted data item, and inputs a task nomenclature 125 after revising the source program 100 that can express a subscript by a constant. This procedure allows a subscripted data item incapable of having a task nomenclature 125 to be replaced by a data item capable of having a task nomenclature 125 through the replacement of a subscript by a constant.

FIG. 19 is a format diagram, showing the format of a record name file 126F having as its element a record name 126 and generated by a record name input unit (not shown).

A record name input unit, which is a data processor (not shown) has a human operator input, as a record name, the name of a record to which a data item having no relation with an external interface and to be extracted as a "task specification", and has the record name file 126F store the record name.

For instance, as shown in FIG. 19, the record name input unit 116 inputs to the record name file 126F a record name "WK-XXX" of the record in line number "000320" defined in "WORKING-STORAGE SECTION." of the source program 100 shown in FIG. 4.

Figure 20:
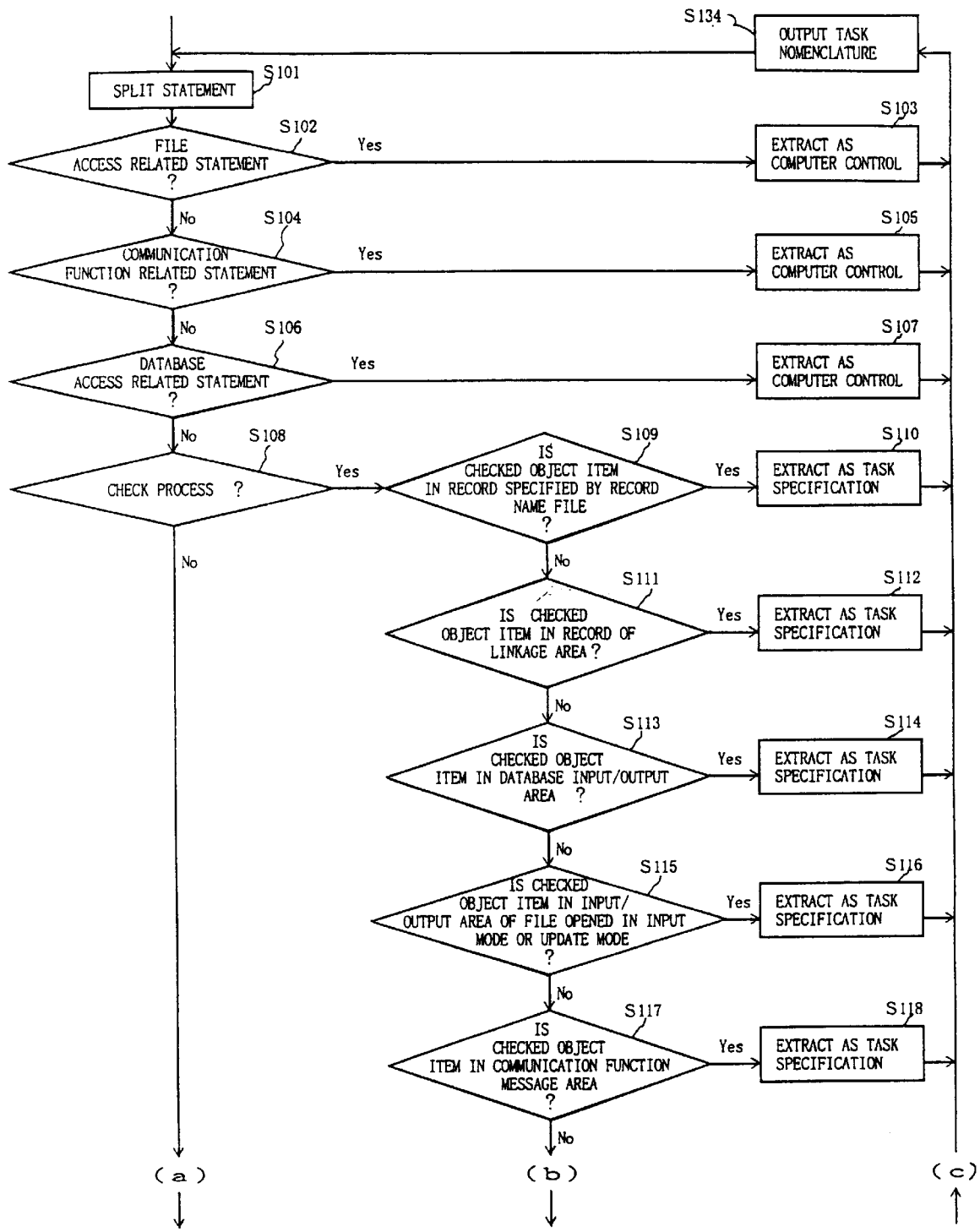
FIG. 20 is a first part of flowcharts, showing in a two-part series the operation of a computer control/task specification data extraction unit 117 shown in FIG. 2.

FIG. 20 is a first part of flowcharts, showing in a two-part series the operation of a computer control/task specification data extraction unit 117 shown in FIG. 2.

Figure 21:
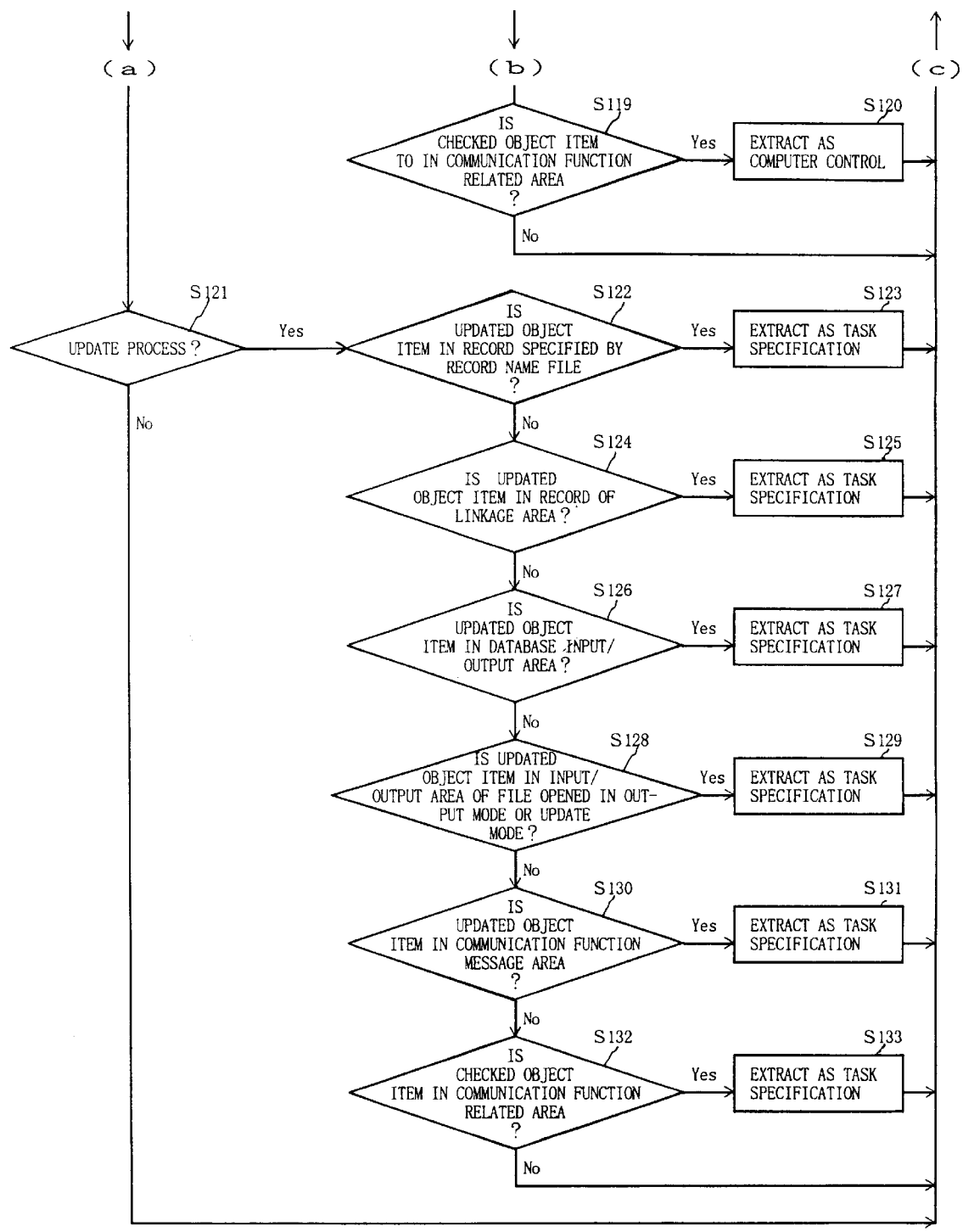
FIG. 21 is a second part of flowcharts, showing in a two-part series the operation of a computer control/task specification data extraction unit 117 shown in FIG. 2.

FIG. 21 is a second part of flowcharts, showing in a two-part series the operation of a computer control/task specification data extraction unit 117 shown in FIG. 2.

Described below is the operation of the computer control/task specification data extraction unit 117 with reference to the source program 100 shown in FIG. 4 and FIG. 28. FIG. 28 will be described later in further detail.

First, the computer control/task specification data extraction unit 117 splits "PROCEDURE DIVISION." of the source program 100 into statement units (S101). Second, the computer control/task specification data extraction unit 117 determines whether or not the head end statement is a file access related command in each of OPEN, READ, WRITE, CLOSE and other statements (S102), whether or not the head end statement is communication function related command (S104), and whether or not the head end statement is a database access related command (S106), respectively. Third, on determining that the head end statement matches any of the command statements, the computer control/task specification data extraction unit 117 extracts the head end statement as a statement for performing a "computer control" (S103, S105 and S107).

Next, on determining that the head end statement matches none of the command statements, the computer control/task specification data extraction unit 117 determines whether or not the head end statement is a statement for performing a "check process" (S108). On determining that the head end statement is a statement for performing a "check process" (S108, YES), the computer control/task specification data extraction unit 117 determines whether or not a checked object matches any data item of the following {1} through {5} (S109, S111, S113, S115 and S117).

{1} A data item in record "WK-XXX" designated by the record name file 126F (S109). This is any one of "WKREC-A", "WK-ENTYEAR", "WK-SERNO", "WK-NAME", "WK-SEC-CODE" and "WK-ERRCODE" in the source program 100 shown in FIG. 4.

{2} A data item in a record in "LINKAGE SECTION." (S111). This is any one of "LK-01", "LK01-01", "LK-01-02", etc. in the source program shown in FIG. 28.

{3} A data item in a database input/output area (S113). This is "RDBREC" in the source program 100 shown in FIG. 28.

{4} A data item in an input/output area of a file opened in an input mode or an update mode (S115). This is any one of "INREC", "INREC-A", "IN-ENTYEAR", "IN-SERNO", "IN-NAME", "IN-SEC-CODE" in the source program 100 shown in FIG. 4 and FIG. 28.

{5} A data item in a communication function message area (S117). This is any one of "MENUREC", "MENU=REC-01", etc. in the source program 100 shown in FIG. 28.

The computer control/task specification data extraction unit 117 performs the determinations in steps S109, S111, S113, S115 and S117 by referring to the source program 100, the data item relation file 120F and the record name file 126F. Then, the computer control/task specification data extraction unit 117 extracts a statement for performing a "check process" for a data item in any of {1} through {5} as a statement for performing a "task specification (check)" (S110, S112, S114, S116 and S118).

On the other hand, upon determining that the check object matches none of these data items (S117, NO), the computer control/task specification data extraction unit 117 determines next whether or not the checked object is a data item in the communication function related area (S119). On determining that the checked object is a data item in the communication function related area (This is any one of "DSP-DEST-1", etc. in the source program 100 shown in FIG. 28.) (S119, YES), the computer control/task specification data extraction unit 117 extracts the statement checking the data item as a "computer control" (S120).

Also, on determining that the head end statement does not perform a "check process" (S108, NO), the computer control/task specification data extraction unit 117 determines next whether or not the head end statement is a statement for performing an "update process" (i.e., a command in each of MOVE, COMPUTE and other statements) (S121). On determining that the head end statement is a statement for performing an "update process" (S121, YES), the computer control/task specification data extraction unit 117 determines whether or not the updated object is a data item matching any one of the following {1} through {5} (S122, S124, S126, S128 and S130).

{1} A data item in record "WK-XXX" designated by the record name file 126F. This is any one of "WKREC-A", "WK-ENTYEAR", "WK-SERNO", "WK-NAME", "WK-SEC-CODE", "WK-ERRCODE" in the source program 100 shown in FIG. 28.

{2} A data item in a record in "LINKAGE SECTION.". This is any one of "LK-01", "LK-01-01" and "LK-01-02" in the source program 100 shown in FIG. 28.

{3} A data item in a database input/output area. This is "RDBREC" in the source program 100 shown in FIG. 28.

{4} A data item in an input/output area of a file opened in an output mode or an update mode. This is any one of "OUTREC", "OUTREC-A", "OUT-ENTYEAR", "OUT-SERNO", "OUT-NAME", "OUT-SEC-CODE" in the source program 100 shown in FIG. 28.

{5} A data item in a communication function message area. This is any one of "MENUREC", "MENUREC-01", etc. in the source program 100 shown in FIG. 28.

The computer control/task specification data extraction unit 117 performs the determinations in steps S122, S124, S126, S128 and S130 by referring to the source program 100, the data item relation file 120F and the record name file 126F. Then, the computer control/task specification data extraction unit 117 extracts an appropriate head end statement as a statement for performing a "task specification (update)" (S123, S125, S127, S129 and S131).

Even if the head end statement is a statement for performing an "update process", on determining that the updated object matches none of the data items {1} through {5} (S130, NO), the computer control/task specification data extraction unit 117 determines next whether or not the updated object is a data item in a communication function related area (S132). On determining that the updated object is a data item in a communication function related area (S132, YES), the computer control/task specification data extraction unit 117 extracts the head end statement for performing the "update process" for this data item as a statement for performing a "computer control" (S133).

However, the computer control/task specification data extraction unit 117 does not extract the head end statement that matches none of the above criteria. After extracting a statement for performing a "task specification" or a "computer control" (S103, S105, S107, S110, S112, S114, S116, S118, S120, S123, S125, S127, S129, S131, S133) as described above, by referring to the task nomenclature dictionary 125D shown in FIG. 18A, the computer control/task specification data extraction unit 117 also outputs a corresponding task nomenclature 125 for a statement whose structure has a condition for which the task nomenclature dictionary 125D has set a task nomenclature 125 (S134).

Thus, the computer control/task specification data extraction unit 117 consummates the processes in steps S101 through S134 to the head end statement, and sequentially repeats the same processes for other statements in "PROCEDURE DIVISION." of the source program 100. On completely performing the processes in steps S101 through S134 for all statements in "PROCEDURE DIVISION." of the source program 100, the computer control/task specification data extraction unit 117 terminates its operation.

In a case of the source program 100 shown in FIG. 4, the computer control/task specification data extraction unit 117 extracts a statement pursuant to the following {1} through {6}:

{1} Because statements in line numbers "000500" and "000510" represent an OPEN command (a file access related command), the computer control/task specification data extraction unit 117 extracts them as statements for performing a "computer control".

{2} Because a statement in line number "000520" represents a READ command (a file access related command), the computer control/task specification data extraction unit 117 extracts it as a statement for performing a "computer control".

{3} Because statements in line number "000530", "000550", "000570", "000590" and "000690" represent a "check process" (an IF statement) for data items "IN-ENTYEAR", "IN-SERNO", "IN-NAME" and "IN-SEC-CODE" belonging to a record of an input file (INFILE), the computer control/task specification data extraction unit 117 extracts them as statements for performing a "task specification (check)". A statement in line number "000690" also represents a "check process" for a data item "WK-SEC-CODE" belonging to a record "WK-XXX" designated by the record name file 126F.

{4} Because statements in line number "000700", "000710" and "000720" represent an "update process" (a MOVE command) for each of data items "OT-ENTYEAR", "OT-SERNO" and "OT-NAME" belonging to a record in an output file (OUTFILE), the computer control/task specification data extraction unit 117 extracts them as statements for performing a "task specification (update process)".

{5} Because statements in line number "000800", "000810", "000820" represent an "update process" (a MOVE command) for each of data items "WK-ENTYEAR", "WK-SERNO" and "WK-NAME" belonging to record "WK-XXX" designated by the record name file 126F, the computer control/task specification data extraction unit 117 extracts them as statements for performing a "task specification (update)".

{6} Because a statement in line number "000900" represents a WRITE command (file access related command), the computer control/task specification data extraction unit 117 extracts it as a statement for performing a "computer control".

FIG. 22 is a format diagram, showing the format of a computer control/task specification data file 127F generated by a computer control/task specification data extraction unit 117 shown in FIG. 2.

The computer control/task specification data extraction unit 117 extracts from the source program 100 statements pursuant to the preceding {1} through {6}, thereby generating a computer control/task specification data file 127F having a format shown in FIG. 22.

The computer control/task specification data file 127F lists the statements in the computer control part and the statement in the task specification part with their line numbers in the source program 100 in the line number sequence. Further, the computer control/task specification data file 127F adds to "TASK SPECIFICATION" either "(CHECK)" or "(UPDATE)", to show clearly a distinction between a "check process" and an "update process" in the task specification part. Additionally, the computer control/task specification data file 127F also lists the record name of the data item used in a condition of the statement used in the task specification part.

FIG. 23 is a format diagram, showing the format of a computer control/task specification data list 127L shown in FIG. 2 generated by a computer control/task specification data extraction unit 117.

The computer control/task specification data extraction unit 117 generates and outputs a computer control/task specification data list 127L shown in FIG. 23. The computer control/task specification data list 127L outputs the source program 100 in a list, and comment data 1001 for the statements in a computer control part and a task specification part.

More specifically, the computer control/task specification data list 127L shows comment data 1001 marking "*" for statements in line numbers "000500", "000510", "000520" and "000900", which correspond to the computer control part.

As well, the computer control/task specification data list 127L attaches to statements in line numbers "000530", "000550", "000570", "000590", "000600", "000690" through "000720", "000800", "000810" and "000820" corresponding to a task specification part, a mark either "C" meaning a "check process" or "U" meaning an "update process", thereby clarifying which process a statement in the task specification part performs. At this time, the computer control/task specification data list 127L also clarifies the name of the record used in the condition in the statement. That is, by referring to the data item relation file 120F shown in FIG. 5A, the computer control/task specification data extraction unit 117 obtains "INREC", "OUTREC" and "WK-XXX" as the names of the record to which the data items used in the source program 100 shown in FIG. 28 belong, and outputs these record names above the column for comment data 1001 in the left side of the computer control/task specification data list 127L and a mark either "C" or "U" at the intersections of the columns for a record name and the rows for a statement for performing a "task specification".

For instance, a statement "IF IN-ENTYEAR IS NOT NUMERIC" in line number "000530", is a statement for performing a "check process" for a data item "IN-ENTYEAR", where the data item "IN-ENTYEAR" belongs to a record "INREC". Hence, the computer control/task specification data list 127L also has a mark "C" outputted to the column for record "INREC" in comment data 1001 for a statement in line number "000530". The computer control/task specification data list 127L also has a mark indicating the process outputted to the column for the name of record to which a data item belongs, for other statements in the task specification part.

In addition, the computer control/task specification data list 127L has a task nomenclature 125 (manually inputted through the task nomenclature input unit 115) superposed on the same output line as the statement for performing a "check process" (with a mark "C"). The superposition of a task nomenclature 125 is done in step S134 shown in FIG. 20, by referring to the task nomenclature dictionary 125D.

FIG. 24 is a format diagram, showing the format of a task nomenclature 125 to be attached to a hierarchical condition shown in FIG. 9.

FIG. 25 is a format diagram, showing the format of a computer control/task specification data list 127L shown in FIG. 2 generated by a computer control/task specification data extraction unit 117 by attaching to a hierarchical condition shown in FIG. 9 a task nomenclature 125 of a task nomenclature dictionary 125D shown in FIG. 24.

Also, assuming that the task nomenclature 125 shown in FIG. 24 is inputted via the task nomenclature input unit 115 to a simple condition 121 extracted from hierarchical conditions shown in FIG. 9, the computer control/task specification data list 127L as shown in FIG. 25 is outputted. Here, however, the computer control/task specification data list 127L omits comment data 1001 and line numbers.

As described above, the computer control/task specification data file 127F and the computer control/task specification data list 127L outputted from the computer control/task specification data extraction unit 117 are used effectively in rebuilding software of an existing source program 100 during daily maintenance works.

That is, in rebuilding software of the source program 100 by using conventional programming languages such as COBOL or a CASE tool 1300 (Refer to FIG. 26.), it is effective for comprehending a processing content to sort the source program 100 by classifying it into {1} a computer control part and {2} a task specification part. For this, the computer control/task specification data list 127L is an effective means. As well, the computer control/task specification data file 127F provides intermediate data for generating input data for a CASE tool 1300.

Also, a reference only to the task specification part, for related records from the computer control/task specification data list 127L for plural source programs 100 each using a file or an exchange parameter as an interface, eases the comprehension of the entirety of a task specification described by plural source programs 100.

Figure 26:
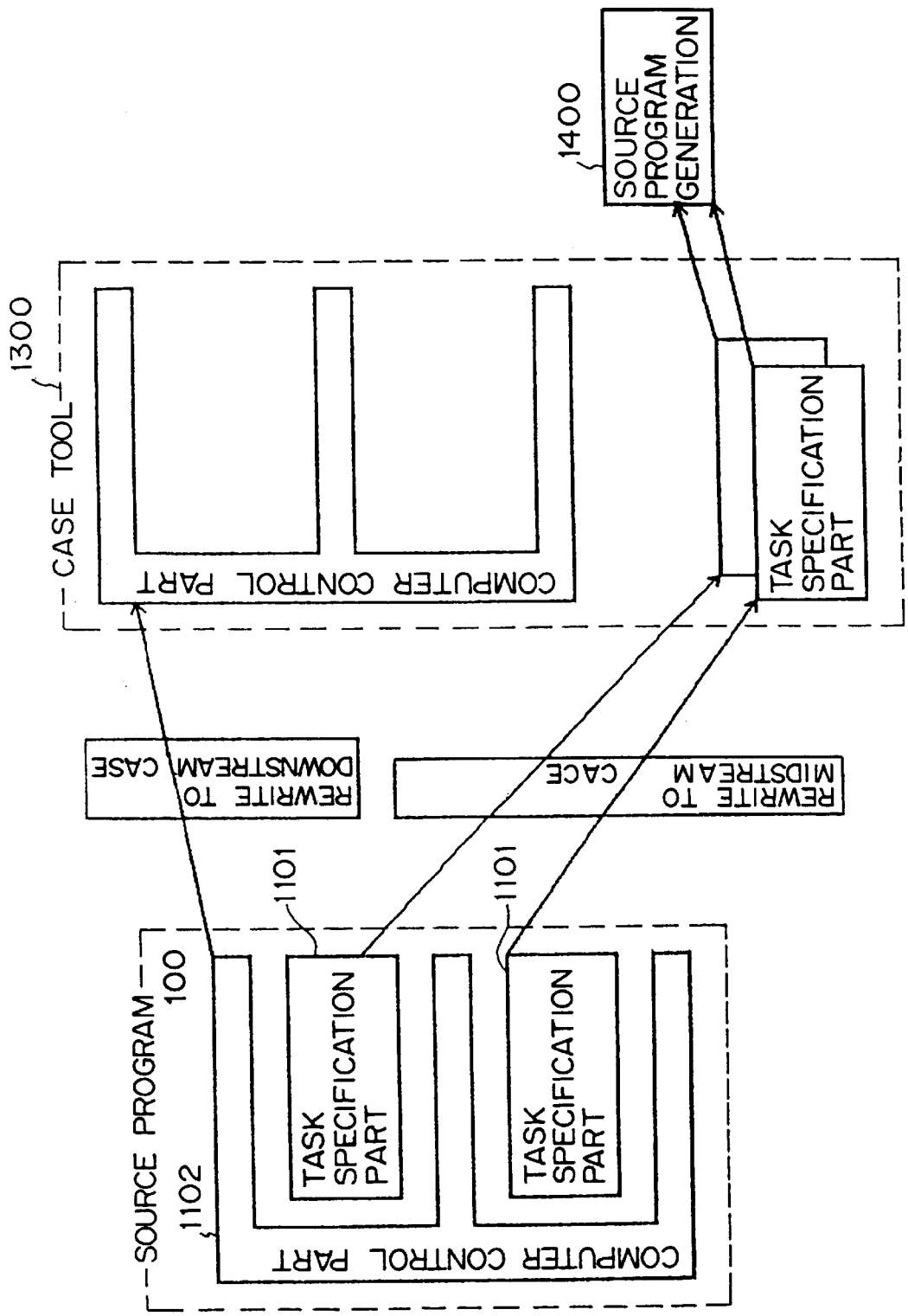
FIG. 26 is a block diagram, showing a method of using a CASE tool 1300 for rebuilding a source program 100.

FIG. 26 is a block diagram, showing a method of using a CASE tool 1300 for rebuilding a source program 100.

More specifically, FIG. 26 is a model diagram, showing a method of using the computer control/task specification data file 127F and the computer control/task specification data list 127L in daily maintenance works of the source program 100 and in rebuilding software.

First, as shown in the left side of FIG. 26, by referring to the computer control/task specification data file 127F and data regarding the task specification part 1101 and the computer control part 1102 are separated from the source program 100.

Of these separated data, data of the computer control part 1102 is used for an input to the CASE tool 1300 for downstream work processes, while data of the task specification part 1101 is used for and input to the CASE tool 1300 for midstream work processes. This enables the CASE tool 1300 to generate the source program 1400.

That is, not only the source program 100 generally has a combination between the task specification part 1101 and the computer control part 1102, but also the task specification part 1101 itself has a combination between a "check process" and an "update process", thus rendering their combinations complex. This embodiment shows that this invention can clearly separate and extract the task specification part 1101 and the computer control part 1102 through the analysis of a record (a group of data items) having an external interface.

Generally, the daily maintenance works for the source program 100 have more to do with the task specification part 1101 and less to do with the computer control part 1102. Accordingly, such an extraction is extremely effective in reducing the workload of a human operator required for a judgment, thereby increasing the efficiency of the maintenance works of a system.

Also, because the computer control/task specification data list 127L is outputted by having a correspondence between a condition in a statement for performing a task specification process and a task nomenclature 125 showing the concrete processing content of the condition, it becomes much easier to understand the processing content of the source program 100. Furthermore, because the computer control/task specification data list 127L is outputted with the result of analyzing the source program 100 superposed on the list of the source program 100 itself, a human operator has a reduced workload in sorting and rebuilding the source program 100.

FIG. 27 is a format diagram, showing the format of data inputted to a CASE tool 1300 shown in FIG. 26.

More specifically, FIG. 27 shows a part of data generated from the computer control/task specification data file 127F shown in FIG. 22.

Described below are the parts of particular pertinence to this embodiment.

The column for "PROCESS NAME" stores the program name of the source program 100. In the example shown in FIG. 27, this column stores "PROGRAM1", which is the program name of the source program 100 shown in FIG. 4. The column for "ITEM SPECIFICATION NAME" stores the name of a record of a processing object together with its sequence number. In the example shown in FIG. 27, this column stores "OUTREC0001". The column for "IDENTIFICATION NAME" stores the identification name of a record of a processing object. In the example shown in FIG. 27, this column stores "OUTREC". The column for "CHECK(?)/UPDATE(=) CLASSIFICATION" stores either "check" meaning a "check process" or "update" meaning an "update process". In the example shown in FIG. 27, this column stores "update".

Because the column for "IDENTIFICATION NAME" designates "OUTREC", and that for "CHECK(?)/UPDATE (=) CLASSIFICATION" designates "UPDATE", the relevant parts in the source program 100 are stored in a table format in the columns for "DATA ITEM", "PROCESS" and "CONDITION". In the case of the computer control/task specification data file 127F shown in FIG. 22, since statements in line numbers "000700", "000710" and "000720" shown in FIG. 4 are relevant, they are stored as in the following table format:

NO.1 OT-ENTYEAR, IN-ENTYEAR, TOKYO SALES OFFICE

NO.2 OT-SERNO, IN-SERNO, TOKYO SALES OFFICE

NO.3 OT-NAME, IN-NAME, TOKYO SALES OFFICE

Thus, by designating each of "ITEM SPECIFICATION NAME", "IDENTIFICATION NAME" and "CHECK(?)/ UPDATE(=) CLASSIFICATION", data for use in a CASE tool of the task specification part corresponding to the designation are generated and outputted. And updating the data for use in a CASE tool after its input into a CASE tool 1300 enables a change in the task specification part in the source program 100. During these works, the computer control/task specification data list 127L is referred to.

FIG. 28 is a first part of lists, showing in a two-part series a source program 100 used as another analysis object in this embodiment, combined with a comment thereto.

FIG. 29 is a second part of lists, showing in a two-part series a source program 100 used as another analysis object in this embodiment.

More specifically, FIG. 28 and FIG. 29 show an example of the source program 100 that has its "DATA DIVISION." define a communication function message area, a communication function related area, a database input/output area and a linkage area.

The source program 100 has "PROCEDURE DIVISION." use the following statements for the respective areas.

{1} A database access related command, e.g. "READY." etc. is extracted as a "computer control".

{2} A communication function related command, e.g. "OPEN I-O DSP-FILE." etc. is extracted as a "computer control".

{3} A statement structure performing a "check process" for a linkage area, e.g. "IF LK-01-01=. . ." is extracted as a "task specification (check)".

{4} A statement structure performing a "check process" for a communication function message area, e.g. "IF MENUREC-01=. . ." is extracted as a "task specification (check)".

{5} A statement structure performing a "check process" for a communication function related area, e.g. "IF DSP-DEST 1=. . ." is extracted as a "computer control".

{6} A statement structure performing an "update process" for a linkage area, e.g. "MOVE ZERO TO LK-01-01" is extracted as a "task specification (update)".

{7} A statement structure performing an "update process" for a database input/output area, e.g. "MOVE ZERO TO DBREC01" is extracted as a "task specification (update)".

{8} A statement structure performing an "update process" for a communication function message area, e.g. "MOVE ZERO TO MENUREC-01" is extracted as a "task specification (update)".

{9} A statement structure performing an "update process" for a communication function related area, e.g. "MOVE ZERO TO DSP-DEST 1" is extracted as a "task specification (update)".

In this manner, as with the case of the source program 100 shown in FIG. 4, the computer control/task specification data extraction unit 117 can generate the computer control/ task specification data file 127F and the computer control/ task specification data list 127L for a statement structure and a command other than "check process" and "update process" for a data item in the record designated by the record name file 126F or an input/output file, as well as a file access related command in each of OPEN, READ, WRITE, CLOSE and other statements.

Although in the above described embodiment this invention causes the computer control/task specification data extraction unit 117 to generate and output the computer control/task specification data file 127F and the computer control/task specification data list 127L for the source program written in COBOL, this invention is nonetheless applicable to the source program 100 written in other programming languages other than COBOL such as FORTRAN and PL/I.

As well, the formats of the computer control/task specification data file, 127F and the computer control/task specification data list 127L are not limited to those shown in FIG. 22 and FIG. 23, but could be in other formats matching an input specification of the CASE tool 1300.

As described above, because this invention automatically separates and extracts from the source program 100 a part mainly taken care of during daily maintenance works and a part dependent on the OS (Operating System) mainly taken care of during the software rebuilding works as necessitated by the specification change of a computer system, this invention greatly reduces the workload of a human operator.

Also, because this invention causes a task nomenclature 125 indicating the concrete content of a "check process" for a condition performing the condition to be outputted together, it enables a human operator to easily understand the content of the "check process".

Besides, because this invention can cause an analysis result to be automatically outputted by superposing it on a list of the source program 100, it reduces the workload of a human operator for sorting and analyzing the source program 100 in rebuilding software.

In addition, because this invention causes data for assisting an input work to a CASE tool 1300 in rebuilding the source program 100 to be outputted, it can enhance the efficiency of the input to a CASE tool 1300.

What is claimed is:

1. An apparatus for analyzing source code statements of a source code program of a program run in a computer system, comprising:

data item information extraction means for extracting from the source code program data item information on relationships between data and usage of source code statements defined in the source code program; and computer control/task specification data extraction means for extracting for an output from the source code program, first data including source code statements unique to the control of the computer system and second data including source code statements for an interface external to the source code program and source code statements regarding task specification, based on the data item, relationships extracted by said data item information extraction means.

2. The apparatus for analyzing the source program according to claim 1, wherein:

said computer control/task specification data extraction means extracts a task specification statement for performing an input check process or an output setting process for data items having an interface with another program or an external peripheral device, among data items extracted by said data item relation extraction means.

3. The apparatus for analyzing the source program according to claim 1, wherein:

said computer control/task specification data extraction means extracts a control statement for performing a file access related process.

4. The apparatus for analyzing the source program according to claim 1, wherein:

said data item relation extraction means extracts, for a data item defined in said source program, a data item name and a record name of a record to which the data item belongs and a usage purpose.

5. The apparatus for analyzing the source program according to claim 4, wherein:

said computer control/task specification data extraction means outputs the record name of the data item used in the statements with the extracted first and second data.

6. The apparatus for analyzing the source program according to claim 6, wherein:

said computer control/task specification data extraction means outputs in a list the first and second data on the statements by indicating the record to which the data item used in the statements belongs.

7. The apparatus for analyzing the source program according to claim 6, wherein:

said data item relation extraction means classifies the usage purpose by type of area to which the data item belongs into a database input/output area, a file input/output area, a communication function message area, and a communication function related area.

8. The apparatus for analyzing the source program according to claim 7, wherein:

said computer control/task specification data extraction means extracts, as a task specification statement, each of the statements performing either a check process or an update process for a communication function message area.

9. The apparatus for analyzing the source program according to claim 7, wherein:

said computer control/task specification data extraction means extracts, as a control statement, each of the statements performing either a check process or an update process for a communication function related area.

10. The apparatus for analyzing the source program according to claim 7, wherein:

said computer control/task specification data extraction means extracts, as a control statement, each of the statements executing at least one of a file access related command, a communication function related command, and a database access related command.

11. The apparatus for analyzing the source program according to claim 7, wherein:

said computer control/task specification data extraction means extracts, as a task specification statement, each of the statements performing either a check process or an update process for a database input/output area.

12. The apparatus for analyzing the source program according to claim 1, wherein:

said data item relation extraction means extracts a file name of a file used in the source program and a record name of a record belonging to the file.

13. The apparatus for analyzing the source program according to claim 12, wherein:

said data item relation extraction means further extracts an open mode of the file being used.

14. The apparatus for analyzing the source program according to claim 13, wherein:

said computer control/task specification data extraction means extracts, as a task specification statement, each of the statements performing a check process for an input/output area of the file opened in an input mode.

15. The apparatus for analyzing the source program according to claim 13, wherein:

said computer control/task specification data extraction means extracts, as a task specification statement, each of the statements performing an update process for an input/output area of the file opened in an input mode.

16. The apparatus for analyzing the source program according to claim 13, wherein:

said computer control/task specification data extraction means extracts, as a control statement, each of the statements executing a file access related command.

17. An apparatus for analyzing source code statements of a source code program of a program run in a computer system comprising:

data item information extraction means for extracting from the source code program data item information on relationships between data and usage of source code statements defined in the source code program;

record name file for storing a record name of a record to which first data on the source code statements in the source code program regarding task specification belong; and computer control/task specification data extraction means for extracting, for an output from the source code program, second data on the source code statements regarding computer control and the first data, based on the data item information extracted by said data item information extraction means and the record names stored in said record name file.

18. The apparatus for analyzing the source program according to claim 17, wherein:

said computer control/task specification data extraction means extracts, as a task specification statement, each of the statements performing either a check process or an update process for at least one of the record having the record name stored in said record name file and a data item belonging in the record.

19. An apparatus for analyzing source code statements of a source code program of a program run in a computer system comprising:

data item information extraction means for extracting from the source code program data item information defined in the source code program;

condition extraction means for extracting conditional source code on relationships between data and usage of source code statements from the source code statements in the source code program;

task nomenclature input means for inputting a task nomenclature for the conditional source code statements extracted by said condition extraction means; and computer control/task specification data extraction means for extracting, for an output from said source code program, first data on the source code statements regarding computer control and second data on the source code statements regarding task specification, based on said data item information extracted by said data item information extraction means, by relating the task nomenclature inputted by said task nomenclature input means to the source code statements regarding the task specification using the conditional source code statements.

20. The apparatus for analyzing the source program according to claim 19, wherein:

said condition extraction means condenses same conditional statements extracted from the statements in the source program by counting their appearance number, and outputs a counter value and condensed conditional statements.

21. The apparatus for analyzing the source program according to claim 19 wherein:

said condition extraction means condenses subscripted conditional statements in the conditional statements extracted from the statements in the source program.

22. An apparatus for analyzing source code statements of a source code program of a program run in a computer system comprising:

data item information extraction means for extracting from the source code program data item information on relationships between data and usage of source code statements defined in the source code program;

condition extraction means for extracting conditional source code statements from the source code statements in the source code program;

task nomenclature input means for inputting task nomenclature for the conditions extracted by said condition extraction means;

record name file for storing a record name of a record to which first data on the source code statements in the source code program regarding task specification belong; and computer control/task specification data extraction means for extracting second data on the source code statements regarding computer control and the first data on the source code statements regarding task specification, based on the data item information extracted by said data item information extraction means, and outputting the source code statements by relating the task nomenclature inputted by said task nomenclature input means to the source code statements regarding the task specification using the conditional source code statements.

* * * * *